US008234391B2

(12) United States Patent
Bonaguro et al.

(10) Patent No.: US 8,234,391 B2
(45) Date of Patent: Jul. 31, 2012

(54) MESSAGING MODEL AND ARCHITECTURE

(75) Inventors: Robert John Bonaguro, Naperville, IL (US); Brian Thomas Manning, North Riverside, IL (US); Michael J. Dupre, Bolingbrook, IL (US); Jeffrey Culver Barcalow, Wheaton, IL (US); John Patrick Merrick, Aurora (IL)

(73) Assignee: Reuters America, LLC., New York, NY (US)

( * ) Notice: Subject to any disclaimer, the term of this patent is extended or adjusted under 35 U.S.C. 154(b) by 995 days.

(21) Appl. No.: 11/533,484

(22) Filed: Sep. 20, 2006

(65) Prior Publication Data

US 2008/0069141 A1 Mar. 20, 2008

(51) Int. Cl.
*G06F 15/16* (2006.01)
*G06F 15/173* (2006.01)

(52) U.S. Cl. .......................... 709/230; 709/201; 709/224

(58) Field of Classification Search .................. 709/201, 709/224, 230
See application file for complete search history.

(56) References Cited

U.S. PATENT DOCUMENTS

| | | | | |
|---|---|---|---|---|
| 4,750,135 | A * | 6/1988 | Boilen | 709/231 |
| 5,187,787 | A * | 2/1993 | Skeen et al. | 719/314 |
| 6,321,252 | B1 | 11/2001 | Bhola et al. | |
| 7,523,169 | B1 * | 4/2009 | Hughes, Jr. | 709/216 |
| 2003/0009431 | A1 | 1/2003 | Souder et al. | |
| 2003/0177279 | A1 * | 9/2003 | Evans | 709/315 |
| 2004/0131082 | A1 * | 7/2004 | Evans et al. | 370/469 |
| 2005/0203949 | A1 * | 9/2005 | Cabrera et al. | 707/103 R |
| 2005/0204054 | A1 * | 9/2005 | Wang et al. | 709/232 |
| 2006/0106941 | A1 | 5/2006 | Singhal et al. | |
| 2006/0136601 | A1 * | 6/2006 | Arora et al. | 709/246 |
| 2006/0161423 | A1 | 7/2006 | Scott et al. | |
| 2006/0184736 | A1 | 8/2006 | Benhase et al. | |
| 2007/0168420 | A1 * | 7/2007 | Morris | 709/204 |

OTHER PUBLICATIONS

Reuters Open Message Model Technical White Paper, version 1.0, downloaded from about.reuters.com/productinfo/rmds/material/OMM_AW.pdf, Aug. 2006, pp. 1-36.*
Search Report and Written Opinion for International Application No. PCT/US2007/018925, mailed Nov. 21, 2008, 10 pages.

* cited by examiner

*Primary Examiner* — Karen Tang
(74) *Attorney, Agent, or Firm* — Banner & Witcoff, Ltd.

(57) ABSTRACT

A system, architecture and model for facilitating extensible messaging and interaction are provided. The message system may use a messaging architecture that includes a domain message model, and open message model and a wire format. The wire format may implement primitive data types that may be used by the open message model to define additional and/or more complex data formats. The open message model may further specify interaction paradigms, generic messages, and message and transport attributes. The generic messages may include payload data whose meaning and context may be defined using the domain message model. The domain message model may include a content definition model and an item type model for building data and object types and specifying data context and relationships. As such, the message system may use generic messages and formats to create different message and item types.

13 Claims, 21 Drawing Sheets

| **Base** |
|---|
| Type |
| Stream Identifier |
| *Extended Header* |

FIG. 5

| Key |
|---|
| Service Identifier<br>Name<br>  Name Type<br>Filter<br>Identifier<br>Opaque Buffer<br>  Opaque Data Format |

FIG. 6A

| State | | | |
|---|---|---|---|
| **Stream State** | **Data State** | **Code** | **Text** |
| Unspecified<br>Open<br>Non-Streaming<br>Closed<br>Closed Recover<br>Redirect | Unspec<br>Ok<br>Suspect | None<br>Not Found<br>Timeout<br>Not Entitled<br>... | |

FIG. 6B

| Quality of Service | |
|---|---|
| **Timeliness** | **Rate** |
| Realtime<br>Delayed<br>  *Delay Time* | Tick By Tick<br>Time Conflated<br>  *Conflation Time*<br>JIT Conflated |

FIG. 6C

| | |
|---|---|
| **Interaction Paradigm** | • Request/Response with Interest |
| **Key – User Identity** | • Name – the actual user identity<br>• Name Type – the type of user identity contained within the Name (e.g. username, email address, etc.) |
| **Unused Capabilities** | • Does not use priority<br>• Does not use quality of service<br>• Does not use event stream groups |
| **Request Message** | • Request a login into an access point<br>• Payload data contains login options/parameters |
| **Refresh Message** | • Response to Request or unsolicited Refresh to reset all login context data<br>• Stream State Open implies login success<br>• Stream State Closed implies login denied<br>• Data in response contains login profile information<br>• Data contained in single refresh message<br>• Refresh Key could define another way of identifying the same user |
| **Update Message** | • Update to some login context data<br>• Cannot be conflated |
| **Status Message** | • Status change to logged-in context<br>• Stream State Closed implies forced logoff |
| **Close Message** | • Logoff an already logged-in context or close a pending login request |
| **Ack Message** | • Optionally used to acknowledge a close (logoff) |

FIG. 16B

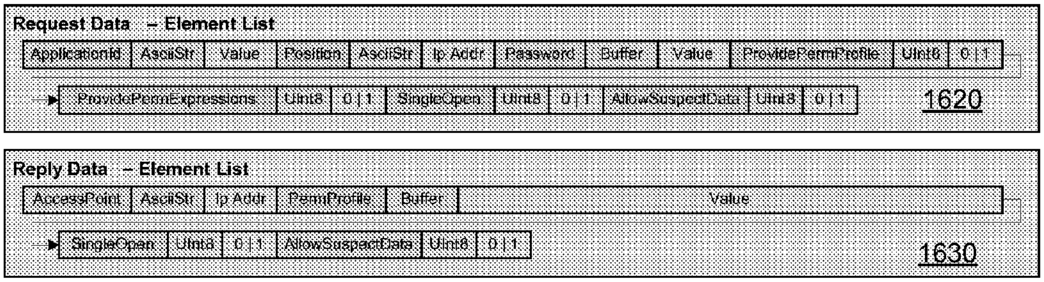

FIG. 16C

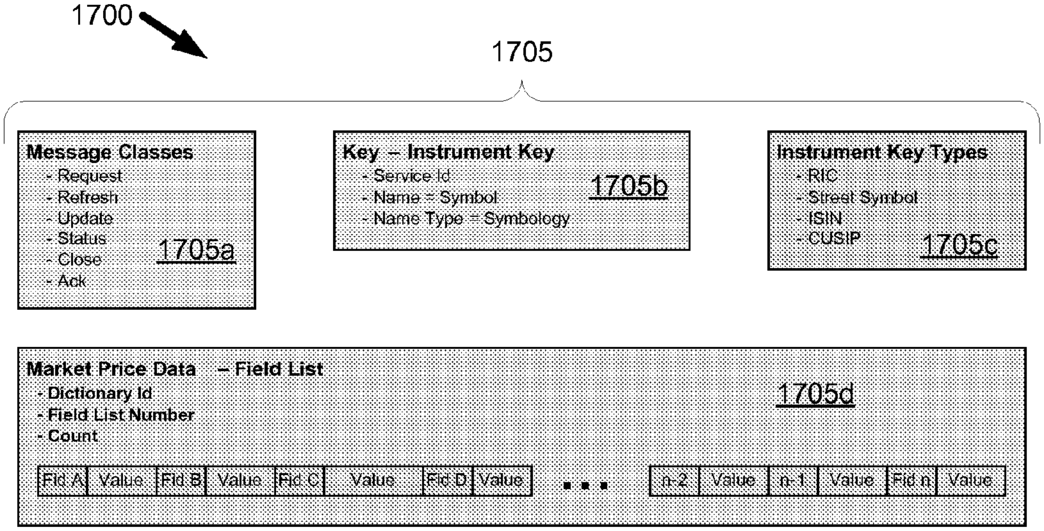

FIG. 17A

| | |
|---|---|
| **Interaction Paradigm** | • Request/Response with or without (snapshot) Interest |
| **Key – Instrument Key** | • Service Id – the identifier of the service for the request<br>• Name – the symbol of the instrument<br>• Name Type – the symbology of the symbol (e.g. RIC, ISIN, etc.) |
| **Options** | • Supports priority<br>• Quality of service applies<br>• Event stream groups apply<br>• Sequence number contains sequence number from exchange |
| **Request Message** | • Request an instruments market price information from an access point (either streaming or snapshot) |
| **Refresh Message** | • Response to Request or unsolicited Refresh to reset all market price/event stream data<br>• Data in response contains all of the market price information for the requested instrument<br>• Data contained in single refresh message (single response)<br>• Refresh Key could define the way the actual service identifies the instrument (ISIN as opposed to a RIC) |
| **Update Message** | • Update to the fields, that where received in the refresh, that have changed value<br>• Updates can be conflated (last field values sent) |
| **Status Message** | • Status change to event stream |
| **Close Message** | • Close an already open event stream or close a pending request |
| **Ack Message** | • Optionally used to acknowledge a close |

FIG. 17B

MESSAGING MODEL AND ARCHITECTURE

FIELD OF ART

The invention relates generally to a messaging architecture, model and associated operators. More particularly, the invention relates to a data messaging model that defines reusable transport and data abstractions for facilitating the definition, structuring, access and production of various types and forms of content.

BACKGROUND

The speed and convenience of messaging has given rise to a multitude of messaging and transport protocols for supporting different types of data and messaging. Messaging and transport protocols are used to define standards by which content is communicated and processed. For example, a message protocol used by financial companies and institutions may define a specific data structure for effective storage and representation of stock prices and market data. In another example, a transport protocol may classify interactions into one or more predefined categories so that communications may be standardized between a receiving device and a sending device. As such, applications and other programs that receive data from various sources must be specifically configured to process and understand a data transmission formatted according to a particular messaging protocol. As can be imagined, an application may be required to possess several functions and/or programs so that the application may handle communications and data from multiple sources, wherein each source uses different transport and/or messaging protocols.

Further, in many instances, requested data and/or content might not translate or convert easily (or at all) into a format specified by a messaging or transport protocol. Thus, some portions of the data and/or content may be excluded from the message transmission so that the transmission may conform to the messaging and/or transport specifications. Specifically, some transport protocols might only accept certain types and/or formats of content. In financial transaction systems, for example, a messaging protocol might only define two fields for a message structure, stock symbol and stock price. Thus, a consumer company and/or user might not be able to also convey transaction volume data in a message using such a messaging protocol.

For the foregoing reasons, an extensible messaging model for handling a variety of data types and formats is needed.

SUMMARY

Many of the aforementioned problems are solved by providing a messaging architecture and model that is extensible and flexible using domain message models. Domain message models may leverage the capabilities of the underlying messaging architecture and model without affecting change thereto. The messaging architecture and model may include a transport layer for defining the constructs that enable a domain message model to specify transport and messaging syntax and semantics while a data layer may be used to define generic data formats such as element lists, field lists, vectors, maps, filter lists and series. The generic data formats may be constructed using a set of primitive data types or building blocks implemented by a wire format. The generic data formats may further be used to create additional data formats and/or types, e.g., by combining various data formats in a message. Transport layer, on the other hand, may provide messaging and transport constructs that allow a domain message model to further specify an applicable context. Thus, a context associated with the messages and transport constructs may be changed by modifying and/or replacing the domain message model without changing the constructs defined by the transport and data layers. A context may specify how data is to be processed by an application and/or what the data represents.

The transport layer may further, in one or more arrangements, classify all interactions into a set of predefined interaction paradigms such as request/response, request/response with interest and listen/send. A request/response interaction refers to interactions where a consumer requests snapshot data. Request/response with interest interactions, however, may relate to requests for data or capabilities that may change over time. Listen/send interactions correspond to interactions where consumers listen for published data without the knowledge of the providers.

In another aspect, the transport layer may define one or more generic message types, as well as attributes within the message types, to support the various interaction paradigms. For example, the generic message types may include request messages, refresh messages, update messages, status messages, close messages and/or acknowledgment messages. Each of the generic messages or message types may further be characterized by one or more base attributes including a type, a stream identifier and an extended header. Type information may be used to specify an item type model represented in the message. Stream identifier, on the other hand, may be used as an identification attribute for event streams (i.e., request/response with interest interactions) while the extended header may be used to handle message attributes that might not fit into the generic attributes. Generic messages or message types may further contain additional attributes and elements such as a key attribute, a state attribute, a quality of service attribute and/or a group identifier attribute.

According to yet another aspect, a domain message model may be included in the messaging architecture to define object types, transport behavior, data representation, meanings and relationships. For example, the domain message model may include two layers: an item type model layer and a content definition model layer. Messages and payload data transported therein may be constructed and/or structured according to an item type model that may convey the transport behavior, messaging syntax and messaging semantics. For example, an item type model may determine the data formats used to represent the payload data. One or more attributes may also be required and/or defined based on the item type model. A content definition model, on the other hand, may provide meaning to data fields and the data itself without modifying and/or altering the underlying open message model (i.e., transport layer and data layer). For example, content definition models may identify one or more data dictionaries which may be used to interpret data. Content definition models may also include enumerations information and/or required/optional field definitions.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIG. 5 illustrates base attributes associated with one or more generic message types according to one or more aspects described herein.

FIGS. 6A-6C illustrate transport attributes associated with messages and interactions according to one or more aspects described herein.

FIGS. 16A-D illustrate components and uses of a login item type model according to one or more aspects described herein.

FIGS. 17A-D illustrate components and uses of a market price item type model according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
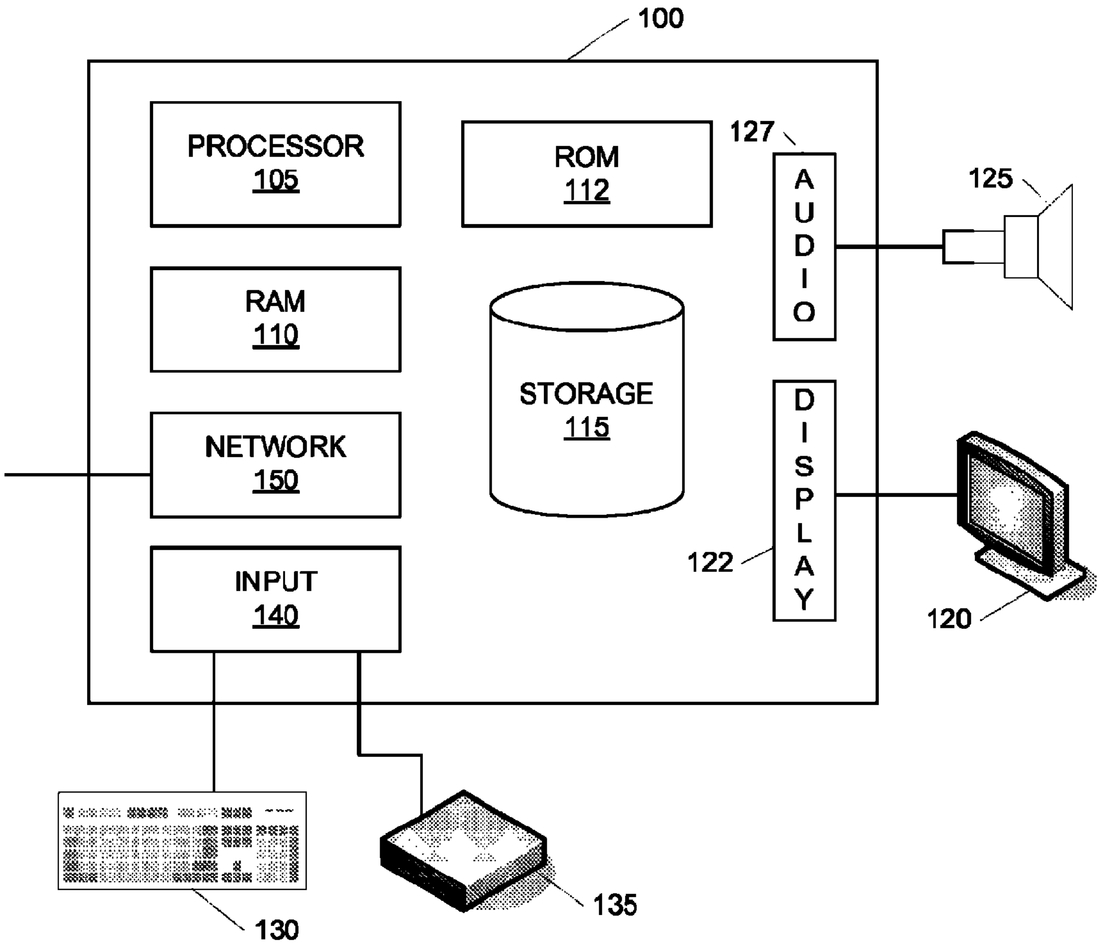
FIG. 1 illustrates a block diagram of a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited for communicating through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instruction associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
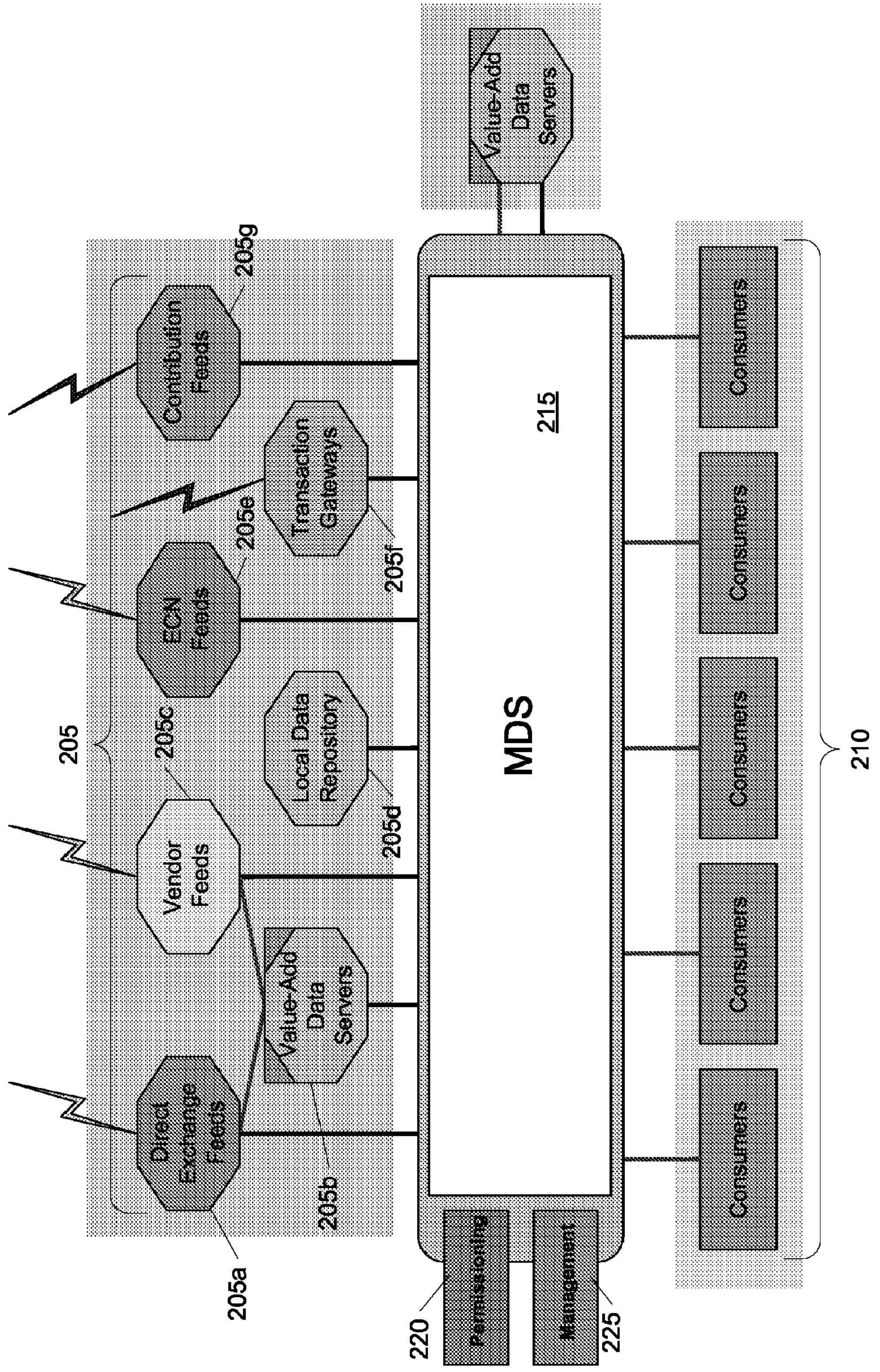
FIG. 2 illustrates a messaging system and infrastructure diagram in which one or more aspects described herein may be implemented.

FIG. 2 illustrates a messaging system and infrastructure for providing information and services from providers 205 to consumer applications 210. Providers 205 may include applications and/or systems that publish data (e.g., market data, transaction information, medical records, etc.) and/or supply services or capabilities. For example, a provider such as transaction gateways 205*f* may facilitate transaction processing in response to a consumer application's request. On the other hand, consumers 210 may retrieve headlines and articles from a news provider such as Electronic Component News (ECN) feed 205*e*. Other types of providers may include direct exchange feeds 205*a*, value-add data servers 205*b*, vendor feeds 2305*c*, local data repository 205*d* and contribution feeds 205*g*.

Communications from consumer applications 210 and providers 205 may be established through a direct connection or, alternatively, through a data system such as market data system 215. In particular, market data system 215 may be deployed between consumer applications 210 and providers 205 to facilitate communications and services there between. In one or more configurations, market data system 215 may correspond to a system such as REUTERS Market Data System (RMDS) 6.0. Market data system 215 may be used to provide application protocol interfaces (API) for parsing, analyzing, formatting and otherwise processing data published by providers 205 for consumption by consumer applications 210. Market data system 215 may further supply proxy services that are capable of organizing large sets of data and/or capabilities obtained from one or more providers 205. Additionally, proxy services may offer an identification scheme for partitioning different providers into one or more service type categories. For example, market data system 215 may categorize data and capabilities according to criteria such as business classification, consolidated vendor, direct exchange feed, exchange gateway and the like. Proxy services may generally be dynamic and may be created and/or removed on the fly (i.e., without interruption of other processes). In one or more configurations, proxy services may be dynamically discovered by consumer applications 210. Permissioning and management blocks 220 and 225 may be used to modify capabilities of data as the data flows through the system. For example, permissioning block 220 may apply permission controls to data, authorizing to denying a consumer access to the data.

Figure 3:
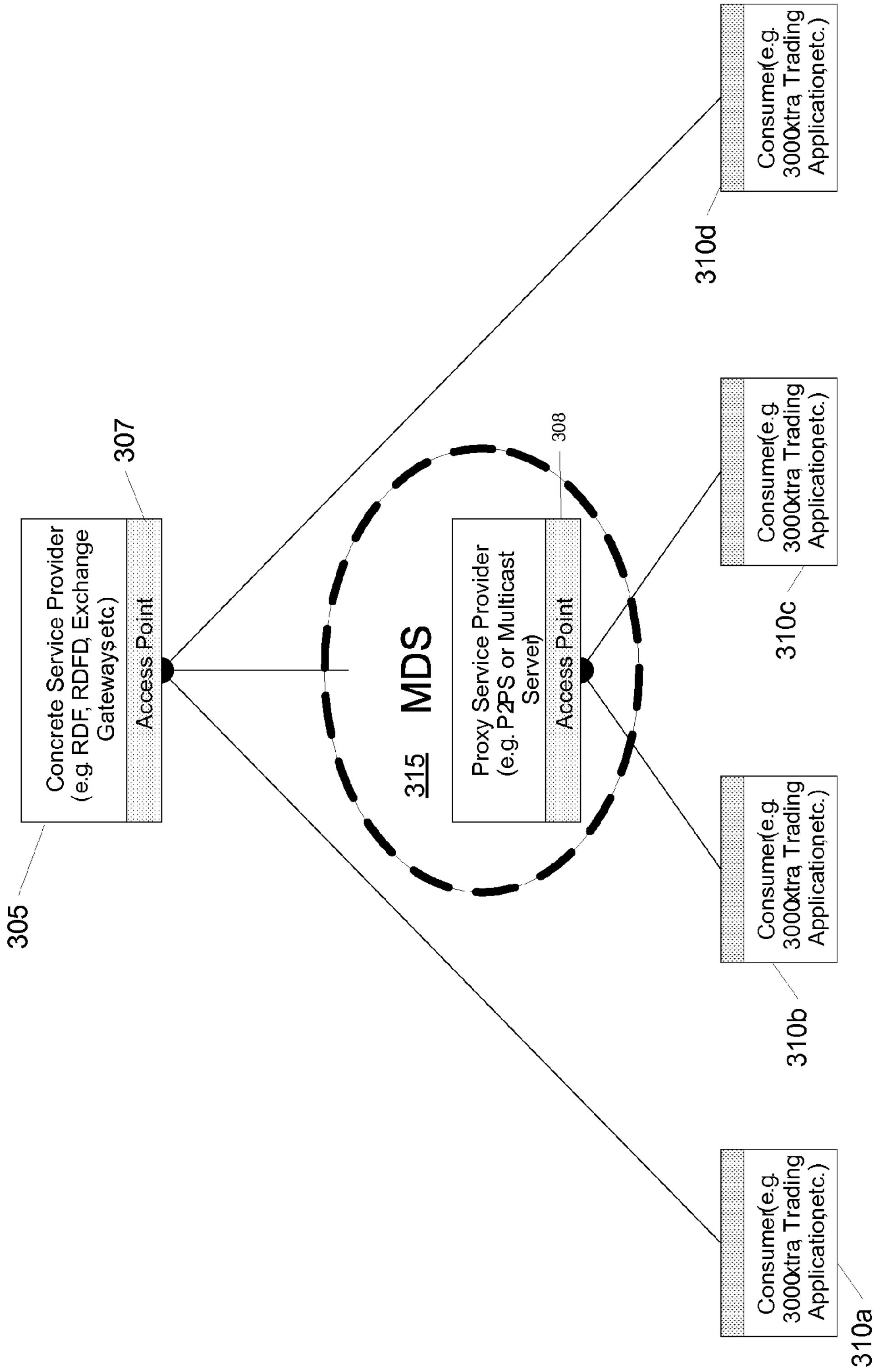
FIG. 3 illustrates a network diagram showing multiple consumer applications interacting with a service provider through different access points according to aspects described herein.

FIG. 3 illustrates a data system configuration including multiple access points 307 and 308 for facilitating the communications and transactions of consumer applications 310 with service provider 305 and market data system 315, respectively. In particular, access point 307 may be a direct or concrete access point whereas access point 308 may constitute a proxy access point. That is, applications 310*a* and 310*d* may access the content and capabilities of service provider 305 directly by interfacing with access point 307. In contrast, applications 310*b* and 310*c* may access the content and capabilities of service provider 305 through access point 308 associated with data system 315 and/or proxy service providers thereof. Direct access points generally permit a consumer application to directly interact with the content and capabilities offered by the service provider(s) corresponding those direct access points. Proxy access points, on the other hand, are associated with data systems and/or proxy service providers thereof that coordinate communications and transactions between a consumer application and one or more service providers. Proxy service providers may be used by consumer applications 310*b* and/or 310*c* when certain capabilities not provided directly by a service provider are needed. For example, a proxy service provider may be used to provide services such as large scale retrieval of data compiled across multiple service providers.

In many current systems, messages transmitted to and received from service providers like service providers 205 of FIG. 2, are required to comply with and adhere to certain message specifications and transport protocols depending on the type and content of the message. New data and message types must usually be built into any intervening data system (e.g., market data system 215 of FIG. 2) or proxy service provider in order to insure compatibility with new interaction and/or message types. Aspects described herein provide an architecture and model that enhances the extensibility of data systems by eliminating the need to pre-define every potential message or data type.

Figure 4:
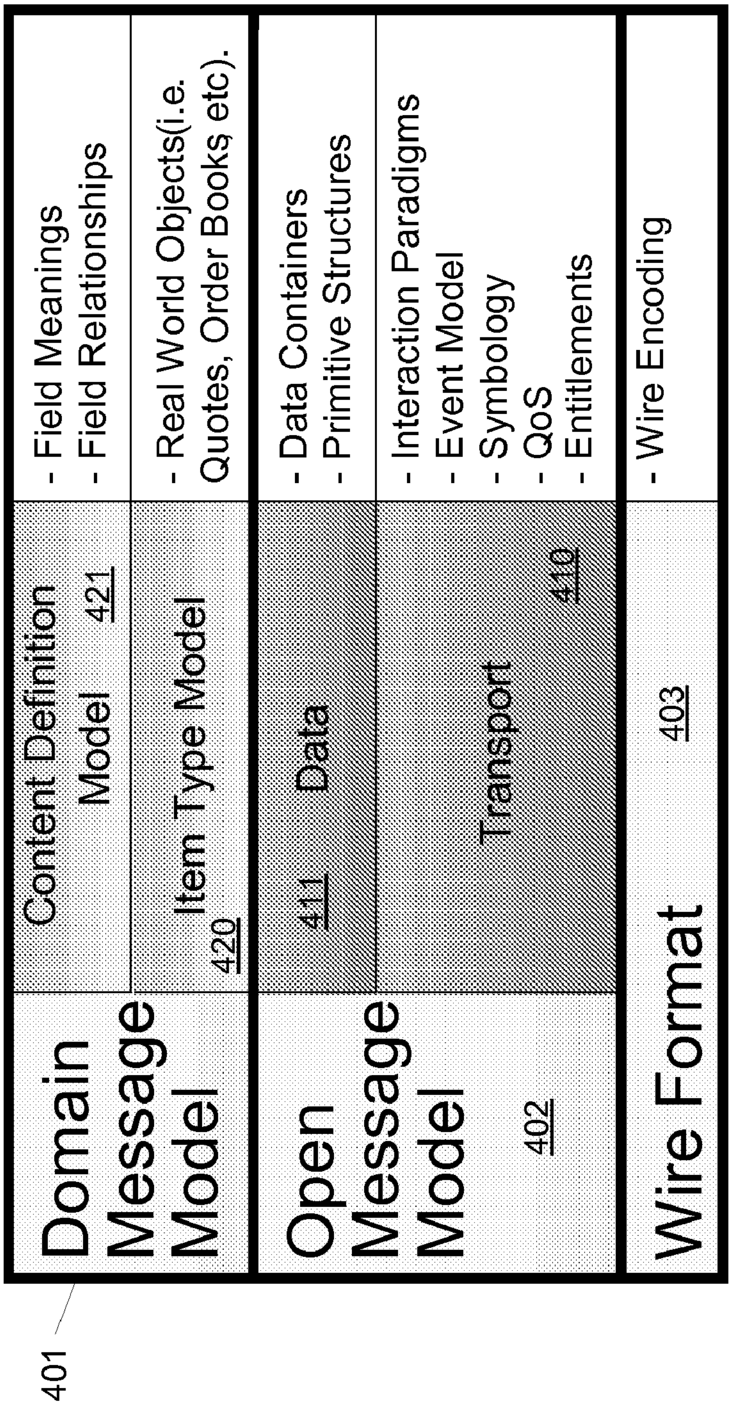
FIG. 4 illustrates a messaging architecture that includes multiple modeling layers for defining a message according to one or more aspects described herein.

FIG. 4 illustrates an extensible messaging model and architecture that includes three functional layers: domain message model 401, open message model 402 and wire format 403. Wire format 403 refers to a universal encoding format may be defined for all communications regardless of data or content type. The universal encoding format may be used, for example, in financial applications where multiple different wire formats (e.g., Marketfeed, QForms, TibMsg, ANSI Page, SSL and RRMP) are presently used. Thus, instead of requiring compatibility with multiple wire formats, data systems may adopt a single wire format. The wire format may implement primitive data types or building blocks that can be transmitted between multiple components and/or devices in a data network (e.g., between a consumer application and a service provider). The primitive data types may then be used according to aspects described herein to build and/or represent more complex transport and data formats (described in further detail below). The primitive data types of the wire format may include fixed sized signed and unsigned 8 bit, 16 bit, 32 bit and 64 bit integers, special value variable sized unsigned 16 bit and 32 bit integers, reserved bit variable sized unsigned 15 bit, 30 bit and 62 bit integers, real values including 32 bit and/or 64 bit integer coefficient and a 6 bit integer exponent, IEEE standard 754 floating point numbers, time and date, buffers of various lengths, ASCII strings, RMTES strings, UTF8 strings and arrays of any of the above variable types or combinations thereof.

According to one or more aspects, open message model layer 402 may be built upon multiple sub-layers like transport sub-layer 410 and data sub-layer 411. Sub-layers 410 and 411 provide the capabilities for defining, structuring and communicating various types of content. Transport sub-layer 410, for example, may be used to encapsulate messages regardless of the specific syntax or semantics associated with those messages. In particular, transport sub-layer 410 may define generic message types and attributes that defer meanings or context to item type models and content definition models created by domain message model 401. In one or more instances, the context or meanings associated with the generic message types may correspond to a manner in which the messages are processed by a consumer application. Items, as used herein, refer to data, capabilities and/or services published by a service provider or otherwise made available. Items may include market price information, stock transactions, price quotes and the like. Transport sub-layer 410 may further define one or more interaction paradigms for categorizing and classifying communications and/or interactions. These interaction paradigms may include request/response, request/response with interest and listen/send. In one example, request/response interactions refer to information requests that is completed upon receiving a response. Request/response with interest, on the other hand, relates to a request for data and/or capabilities that may change over time. Thus, in a request/response with interest paradigm, an initial response might only include an acknowledgment message. However, interaction remains active even after the initial response (an event stream is created) to provide update responses (i.e., events) to the requesting user or application. For example, an event stream may provide market prices of stock or news headlines that tend to change periodically and/ or intermittently. Listen/send (i.e., publish/subscribe) interactions covers transmissions from a service provider that has no knowledge of possible consumers. Instead, consumers may anonymously subscribe or listen to the data published/sent by the service provider.

Alternatively or additionally, transport-sub layer 410 may further define one or more generic message types associated with the various interaction paradigms. Such generic message types may include request messages, refresh messages, update messages, status messages, close messages and acknowledgment messages. Refresh messages may be used to respond to request messages with attribute information and/or content. Refresh messages may also be used to asynchronously change the data of an already opened event stream. Update messages on the other hand, may correspond to asynchronous data events associated with an already opened event stream. In one or more arrangements, a refresh message may refer to an initial message sent to a consumer in response to a request whereas an update message is used to modify data within the initial message that has changed. A status message may be used to represent asynchronous attribute changes associated with an already opened event stream. For example, a status message may be sent if a data or event stream is redirected to another provider. Further, close messages may be used to close an outstanding request for an existing event stream while acknowledgment messages may be used to acknowledge an outstanding request or close request/message. Using a domain message model (e.g., model 401 of FIG. 4), the generic message types may be used to convey a variety of messages and data while maintaining the underlying semantics, structure or content. In one example, financial data may be transported and defined using the same generic message types and transport semantics as are used with defining and transmitting news reports. The context and manner in which the transmitted data may be processed and defined may be modified by changing and/or replacing the applicable domain message model without having to modify or alter the semantics, syntax and constructs defined by the transport and data layer. In other words, changing the context of messages may be performed while maintaining the transport and data layer. Thus, the extensibility of the content message model is independent of the context for which the content message model being used.

Each of the generic message types may be characterized by one or more sets of base attributes. Examples of such base attributes may include a type, a stream identifier and an extended header as is illustrated in FIG. 5. The type attribute may generally be used to identify an item type model represented in the message while the stream identifier may be used as an optimization feature for allowing applications to refer to event streams with different value (e.g., an unsigned 32 bit value) instead of a full key. Using the stream identifier instead of the full key may conserve bandwidth usage. Further, by identifying the item type model associated with the message, a consumer or recipient of the message will be able to appropriate parse and process the data contained in the message. As such, data for representing a variety of real world objects (e.g., quotes, order books, etc.) may be transmitted using the generic message models described herein. Additionally, in one or more events where a message attribute is identified that does not fit within any of the generic message attributes, an extended header may be used to store this information. One or more of the base attributes may further be optional depending on the preferences and/or specifications of an item type model.

In one or more configurations, the generic message types defined by a transport sub-layer such as sub-layer 410 of FIG. 4 may further include transport attributes in addition to message attributes. Transport attributes may be used to characterize the transmission rather than the message contained therein. For example, FIGS. 6A-6C illustrate multiple transport attributes and models, including key, state and quality of service (QoS) that may be included in one or more generic message types. Key attribute, as illustrated in FIG. 6A, may further include fields or data elements that specify information such as a service identifier, a name of the information requested, a name type, a filter for storing optional content/formats, an identifier for identifying different information (e.g., a version number), an opaque buffer that allows the use of other identification mechanisms (e.g., query, complex filters, etc.) and opaque data format for specifying the data format of the opaque buffer. One example use of opaque buffers is to provide an SQL/XML query to a historical database. In another example, the filter field may be used to specify selectable value for choosing one or more of a plurality of content desired. In particular, if a consumer only wants summary information to determine the dictionary type is, a corresponding value may be specified by the consumer in the filter field.

FIG. 6B illustrates a generic state model that defines various status indicators that may be used to characterize an interaction. Status information may be divided into multiple categories including stream state, data state, code and text. Stream state conveys information regarding the state of the event stream when using a request/response with interest paradigm. However, in non-stream paradigms (e.g., request/response), the status may be set to "non-streaming." An "unspecified" stream state indicates that the state was not specified or that a request is pending. "Open" stream states specify that an event stream is actively open and that asynchronous events may occur at any time. "Closed" states, on the other hand, denote the opposite status of an "open" state. In other words, "closed" states indicate that the stream is closed is not available from the provider. "Closed recover" status corresponds to a closed stream that is to be re-opened by a consumer application. The stream state may further be set at "redirected" status, signifying that the information or capability requested is available at another service provider or location. The service provider or location where the information or capability is available may be specified in the key.

Data state may be used to represent the quality of the data conveyed in the response in an event stream. Data states may include unspecified (i.e., state of data is unspecified), OK (i.e., data state is valid and/or up to date) and suspect (i.e., state of data is unknown or stale). In addition to stream state and data state information, state codes may be defined to provide additional status information for the stream and/or data state. These state codes may include none (no additional information available), not found (item is not available from provider), timeout (request has timed-out), not entitled (consumer is not entitled to access item), invalid argument (invalid argument passed in request), usage error (illegal usage of message or message content), preempted (event stream has been preempted to create room for another event stream), just-in-time (JIT) conflation started (conflation of data on an as-needed basis) realtime resumed (just-in-time conflation has ended), failover started (source mirroring failover has started on a service), failover completed (recovery from one provider to another is complete for a service gap detected (detection of a message gap from data originator), no resources (no more resources exist to handle the request), too many items (user or consumer has reached max number of event streams allowed), already open (event stream is already open for consumer), service unknown (service identifier specified in key does not exist) and not open (event stream is not open and cannot be closed). Further, text may also be included in the state model to supply textual information about the stream and/or data state.

FIG. 6C illustrates a QoS model for classifying data and/or events into tiers of service. QoS may generally include two properties, timeliness and rate. Timeliness represents the age of the data while rate indicates a maximum period of change in the data (for streaming events). Timeliness may be decomposed into two sub-properties, real-time and delayed. Real-time may imply that no delay is applied to the data. In other words, the data is up-to-date and sent by the provider as soon as it occurs. Delayed, on the other hand, may indicate that the data reflects a historical view of the request information. If data is delayed, a delay time attribute or property may be specified to allow a user or consumer to compensate for the delay.

Rate of change, as used by the QoS, may be categorized as tick-by-tick, time conflated or just-in-time conflated. Tick-by-tick implies that the consumer receives every update, or change, in the content while conflation implies that multiple events are combined in a manner that preserves the final view of the content. Conflation may be based on time or may be based on other parameters such as channel capacity, congestion and the like. Time conflation and just-in-time conflation may differ with respect to the interval at which data is conflated. In particular, time conflation refers to conflating at regular intervals while just-in-time conflation relates to conflation on an as-needed basis. Thus, in one example, a consumer may specify, in a request, whether realtime data or delayed information is desired and whether the data is to be updated according to a tick-by-tick protocol or conflation mechanisms. Realtime data and/or tick-by-tick data may be classified as a higher tier service that charges a consumer or a user a higher fee than delayed or conflated data service.

Another transport attribute that may be used to characterize transmissions is a group identifier. Group identifiers may specify an item group to which an event stream belongs (e.g., for a response/request with interest interaction). Item groups may be defined by a provider according to the provider's preferences and needs. In one example, a provider may maintain multiple data links to data services. As such, multiple consumer requests corresponding to a first data link may be grouped into a first item group. Similarly, consumer requests corresponding to a second data link may be grouped into a second item group. If a data link becomes suspect, the provider may mark the status of all event streams in the item group corresponding to the data link as suspect. The item group assignments may be established and/or communicated to a consumer at various times including in an initial refresh message.

Figure 7A:
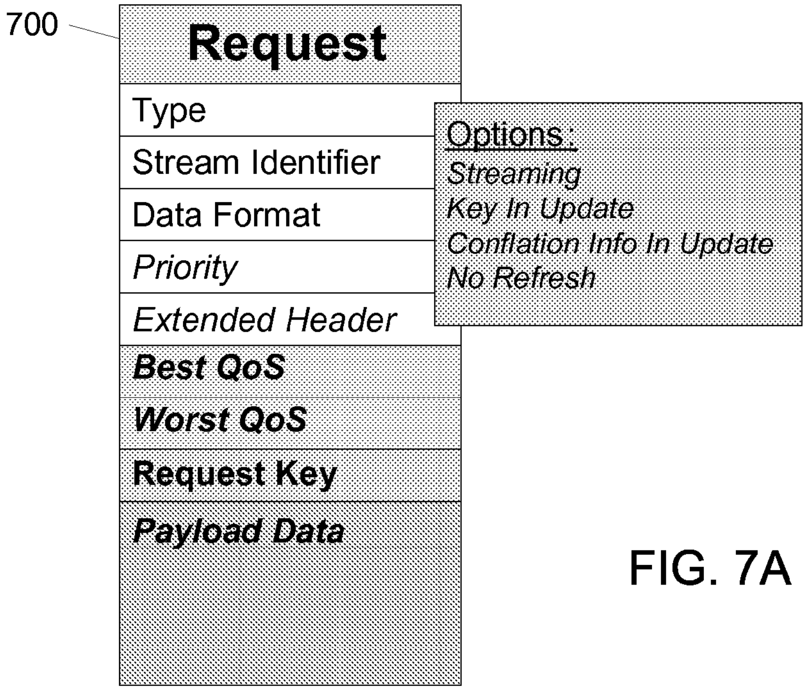
FIGS. 7A-7F illustrate multiple generic message type models according to one or more aspects described herein.

The generic message types defined by the transport sub-layer (e.g., transport sub-layer 410 of FIG. 4) may each be defined by one or more message and transport attributes. For example, FIG. 7A illustrates a request message model including multiple data fields and elements. In addition to the base attributes described with respect to FIG. 5, request message model 700 may include a data format specification that indicates a generic format of the payload data and a priority level that specifies the relative importance of the request/data stream. Request message model 700 may also specify quality of service (QoS) using the best QoS field and worst QoS field to define an acceptable QoS window. A request key may further be included in message model 700 to identify the content or capability desired. Payload data represents the raw data buffer encoded in a format specified by the data format element. For example, a transaction request message may include transaction information in the payload data field.

In one or more configurations, request message model 700 may include one or more request options such as streaming, key in update, conflation information in update and no refresh. Streaming option may, for example, correspond to a desire to create an event stream based on the request (e.g., request/response with interest paradigm). Key in update may indicate that a consumer wants the key encoded in every update message. The conflation information in update option may specify that the consumer wants any update conflation information included in the update while the no refresh option is used to indicate that no refresh message (i.e., response) is needed or desired. A consumer might not want a response in various instances such as a case where a request message is only used to update priority information regarding a previous request. One or more of the fields depicted by request message model 700 may be optional (i.e., they do not need to be set/defined in the message).

Figure 7B:
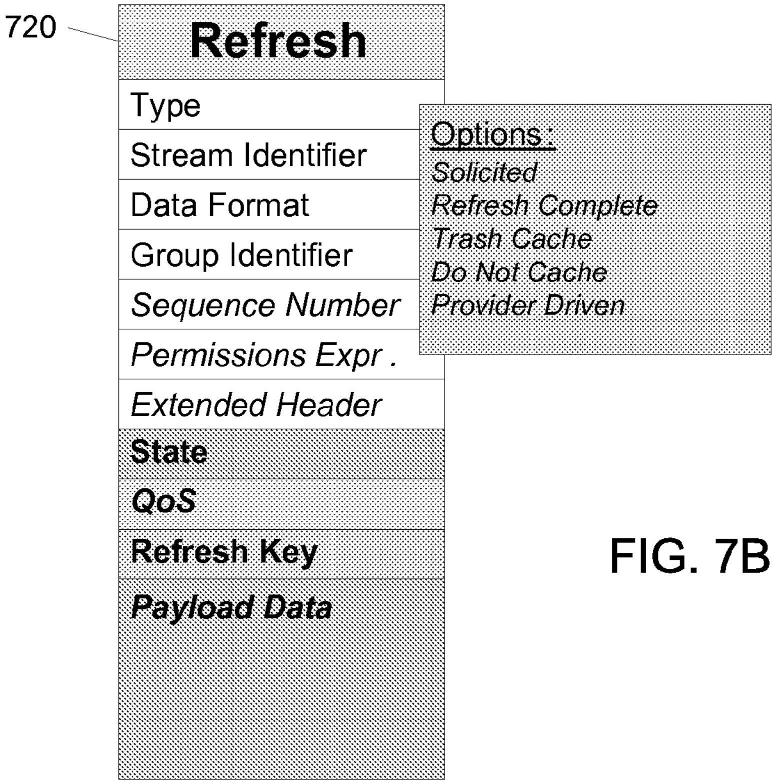

A service provider may respond to a request message built in accordance with request message model 700 via a refresh message defined by refresh message model 720 of FIG. 7B. Similar to request message model 700, refresh message model 720 may include base attributes such as type, stream identifier and extended header. Further, refresh message model 720 may include transport attributes such as QoS specifications, state information, a group identifier and key information. Payload data stores the requested data in a buffer encoded according to the format specified in the data format field. Refresh message model 720 may also include a permissions expression field that defines the requirements needed to access a requested item data/event stream. For example, if access to financial forecasts is restricted to certain personnel, authentication information (e.g., login/password) may be required in order to retrieve the data. Refresh message model 720 may further include a sequence number for indicating the last sequence number associated with the event stream. The sequence number allows a consumer to construct a timeline of events (or data) in proper sequence.

Additionally, refresh message model 720 may be associated with one or more refresh options including solicited, refresh complete, trash cache, do not cache and provider driver options. A solicited denotation relates to whether a message is a solicited refresh to a request or an unsolicited refresh to an existing event stream. A refresh complete flag indicates whether a refresh or unsolicited refresh is complete. For example, some item type models (as defined by a domain message model) may require a single refresh that has a refresh complete flag set with the data. Trash cache option is an indicator that specifies whether previous payload data cache needs to be deleted. Do not cache option, on the other hand, instructs the consumer not to cache the data contained in the current refresh. Further, the inclusion of the provider driven option is an indication that the item is being sent to the consumer without a request (i.e., broadcast mode). One or more of the above options, attributes and message elements may be optional.

Figure 7C:
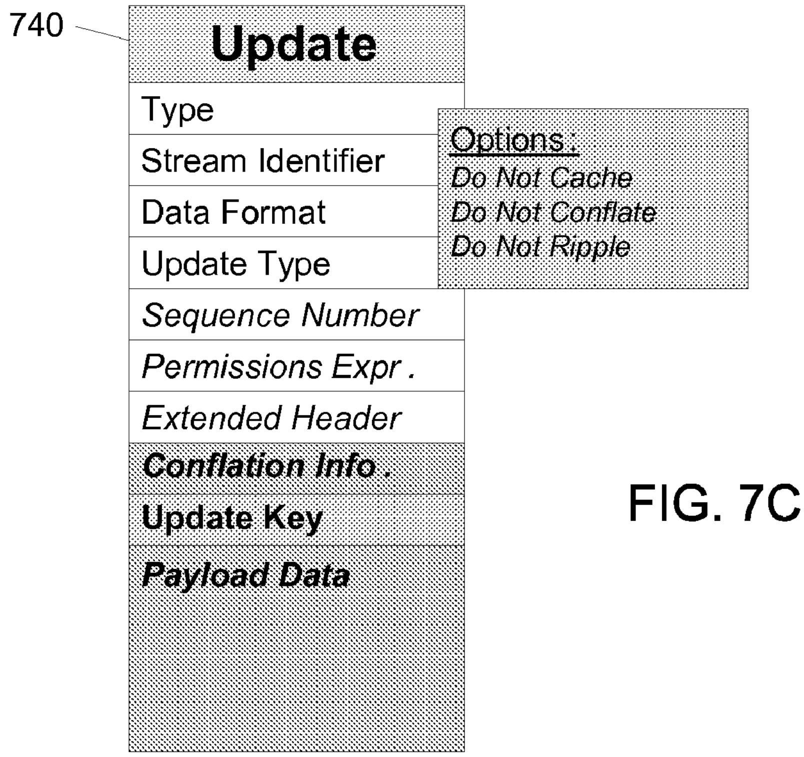

Update message model 740, as illustrated in FIG. 7C, defines update messages configured to represent asynchronous data events associated with an event stream. Update messages may be assigned different uses and/or meanings depending on the item type models and/or domain. Update message model 740 may, in one or more instances, share many of the same message elements and fields as refresh message model 720 (FIG. 7B). For example, update message model 740 may also include fields and elements such as permissions expression and sequence number. Update message model 740 may include additional fields such as update type and conflation information. Conflation information provides information related to any conflation logic that may have been applied to a given event. Update types, on the other hand, may be used to identify a type of update to which the update corresponds. One or more update types may be defined by the specified item type model.

In addition, update message model 740 may be associated multiple options including do not cache, do not conflate do not ripple and provider driven. The selection and/or use of the do not ripple option restricts rippling of any fields within the update. Do not conflate, on the other hand, instructs a consumer or recipient of the message to not conflate the payload data in the update message. For example, a service provider may instruct a consumer not to conflate news headlines.

Figure 7D:
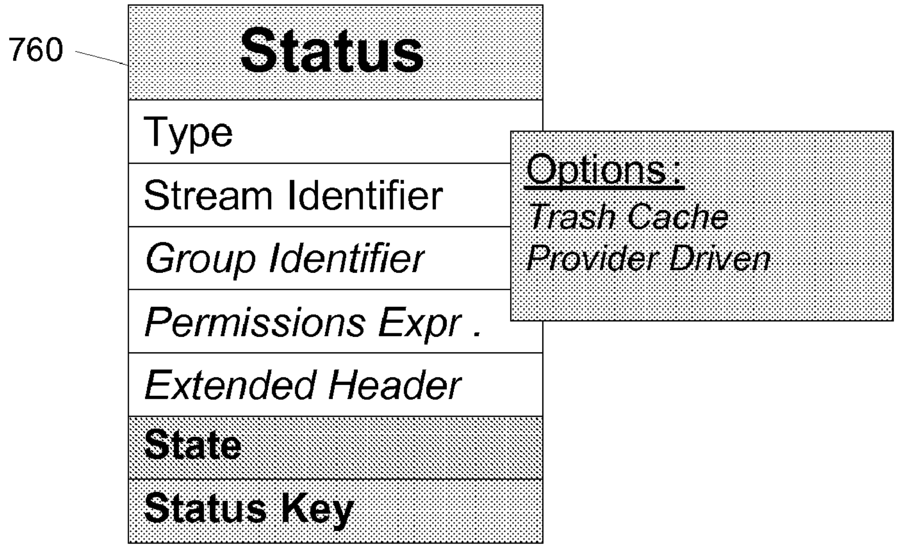

FIG. 7D illustrates a status message model for modifying the status of data or an event stream. A new state may be specified in a state field of status message model 760. For example, status of an event stream may be changed from “Open” to “Redirect.” Status message model 760 may also include a group identifier field to allow a provider to change the statuses of multiple event streams within a group using a single message. Status model 760 may further include options such as trash cache and provider driven.

Figure 7E:
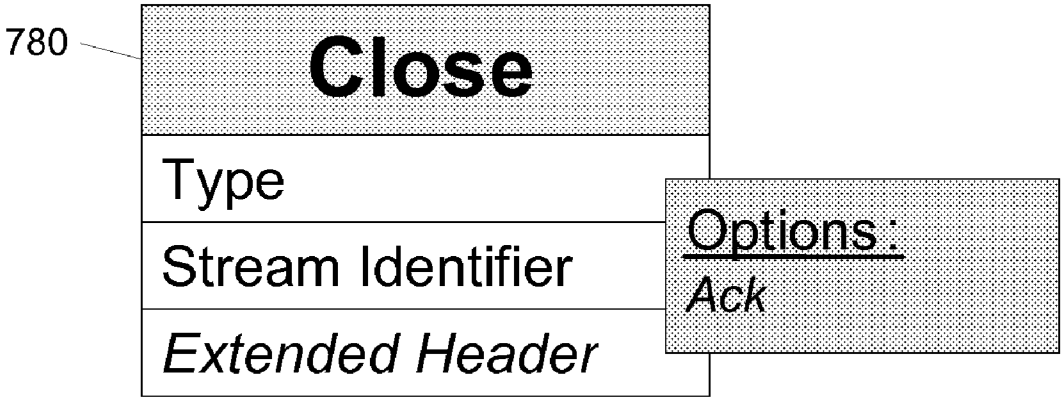
Figure 7F:
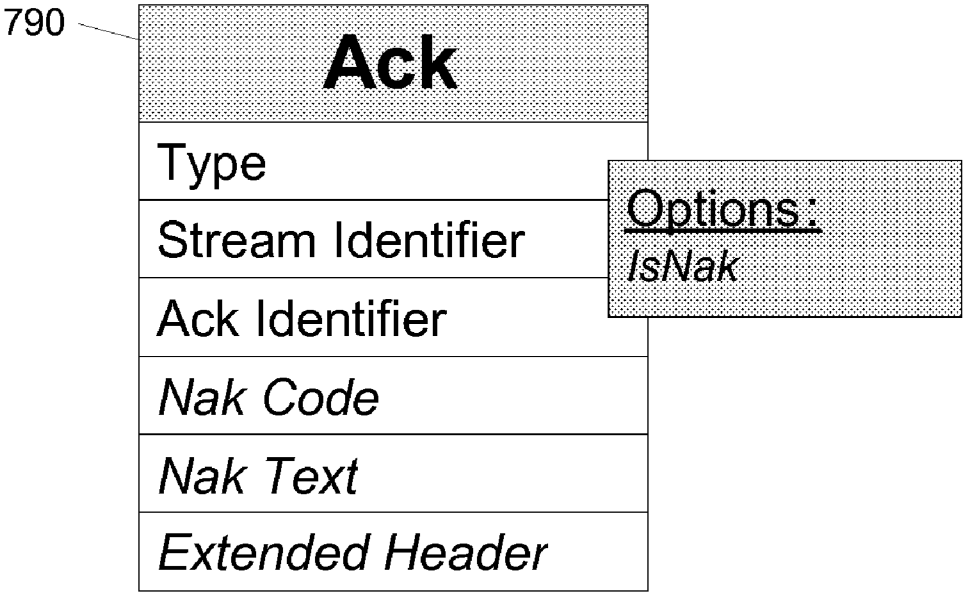

FIGS. 7E and 7F illustrate models corresponding to close messages and acknowledgment messages, respectively. Close message model 780 includes the base message attributes and an acknowledgment option. The acknowledgment option indicates that the provider should acknowledge the close when received and/or applied. Thus, when a consumer seeks to close an event stream, the consumer may request that the provider confirm the request through the acknowledgment option. Acknowledgment message module 790 may define acknowledgement messages that may be used, in one or more instances, to acknowledge the close request message from a consumer. Acknowledgement message module 790 may include an acknowledgment identifier (i.e., Ack Id), and an IsNak option. If the IsNak option is set, the message may be treated as a negative acknowledgment message. Further, the activation of use of the IsNak option may further indicate that the message includes Nak code and Nak text.

Any of the aforementioned generic message types may be used to create and distribute information from either the consumer or the provider or both. That is, a request may originate from the provider and sent to the consumer and vice versa. The flexibility of the open message model allows for the bi-directional communication and distribution of information.

The payload data that may be included in each of the request, refresh and update messages may be defined according to one or more data formats and/or abstractions. These data formats and/or abstractions are generally managed by a data sub-layer (e.g., data sub-layer 411 of FIG. 4) of the open message model. According to one or more arrangements, an open message model such as model 402 may use basic data types implemented by a wire format like wire format 403 to define more complex data formats and types. As discussed, wire format 403 may include such basic data types as signed integer values, IEEE 754 floating point numbers and UTF8 strings. Other data constructs supplied by data sub-layer for defining data formats and types may include record sets and summary data. In particular, summary data may store information that pertains to multiple data fields or entries in a data structure. For example, summary data may be used to specify a currency associated with multiple stock prices stored within a data structure. Thus, each stock price entry in the data structure might not need to individually store the currency information.

Figure 8:
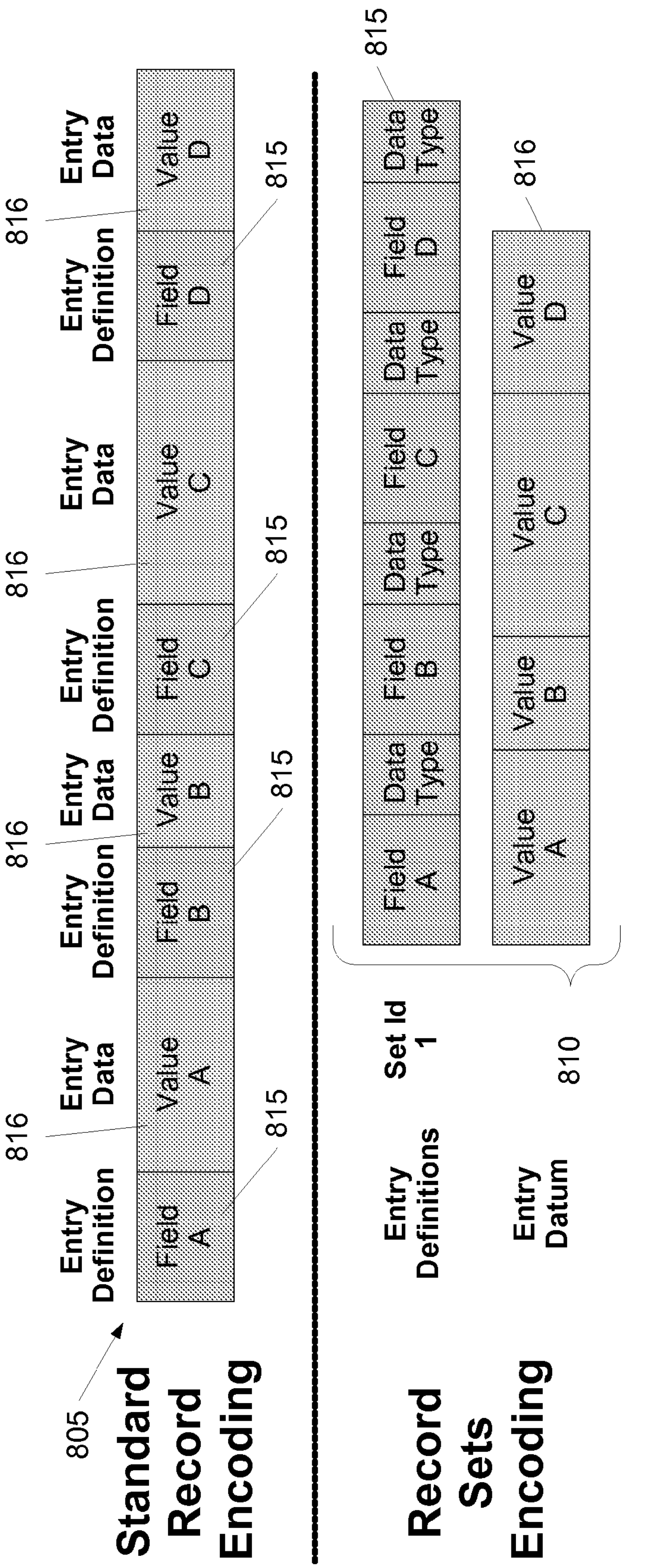
FIG. 8 illustrates two forms of record encoding according to one or more aspects described herein.

Record sets may be defined by the data sub-layer to optimize bandwidth for record based data. Record based data may generally be represented by field/value pairs. The field component, for example, may store an entry identifier while the value may store the information or data corresponding to the entry identifier. For example, a field/value pair may be used to store stock price data. That is, the field component may be used to identify the stock price field while the value may correspond to the price value of the identified stock. FIG. 8 illustrates two record-based data structures, one data structure built upon standard record encoding and the other constructed using record sets encoding. Standard record encoding structure 805 stores and encodes record data as repeating field component and value pairs. Record sets encoded structure 810, on the other hand, may be stored and encoded by separating field components 815 and their data type from values 816. Thus, a single record set definition or entry definition 815, may be sent/defined/stored through multiple field components 815 and their types. Multiple records may then be represented by a single entry definition 815 and an entry datum 810 for each record.

Figure 9:
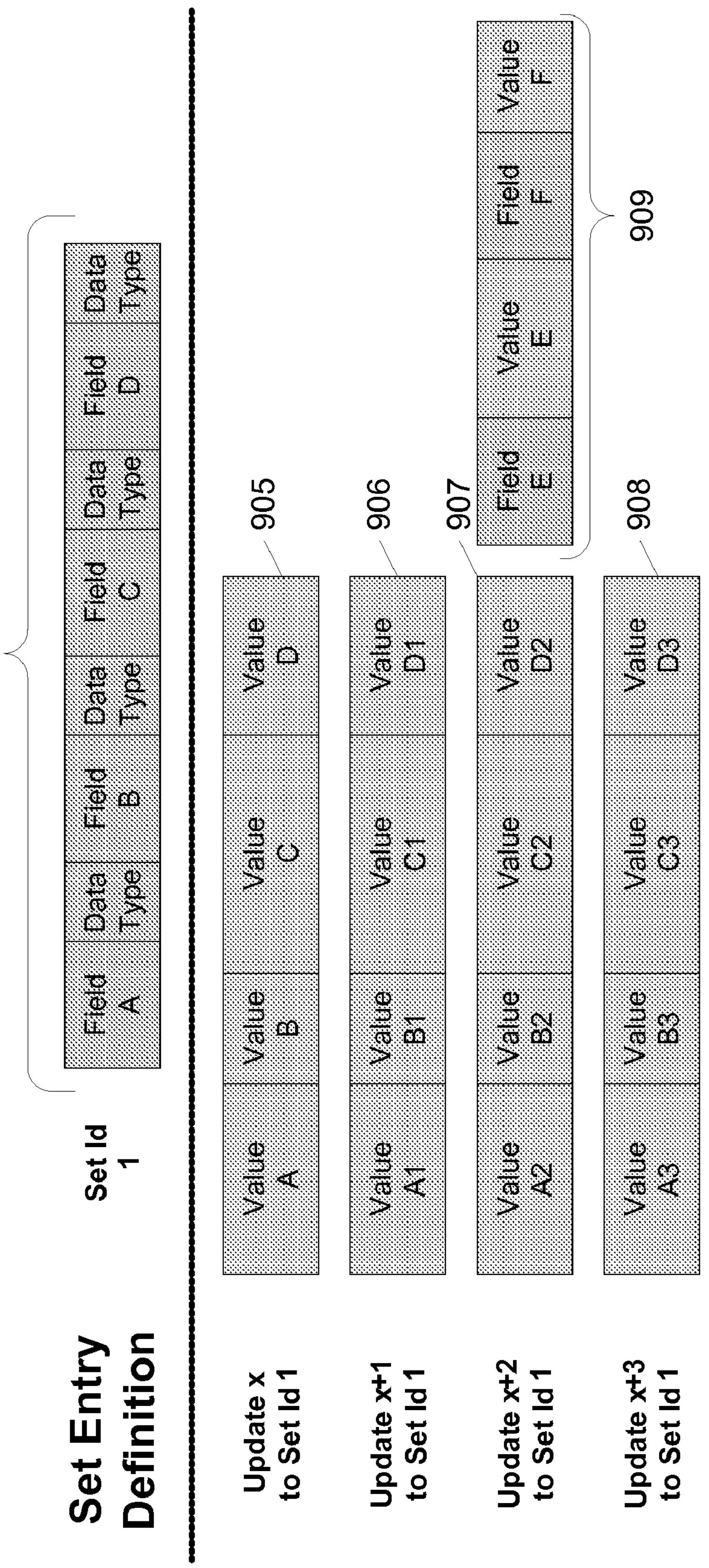
FIG. 9 illustrates data encoded using record set encoding according to one or more aspects described herein.

Alternatively or additionally, standard record encoding and record set encoding may be intermixed within a single message as is illustrated in FIG. 9. This permits record sets to be defined for common cases while also supporting the extensibility of an open system. In FIG. 9, for example, single entry definition 901 may be created for 4 sets of records 905, 906, 907 and 908. Records 905, 906 and 908 may all correspond and/or adhere to the format defined by entry definition 901. Record 907, however, may include not only the data specified by entry definition 901, but also additional data values not defined by entry definition 901. Accordingly, the additional data values 909 may be encoded using standard record encoding and appended to the record set encoded portion of record 907.

Record sets may be identified and defined at either a local or global scope. Local scope relates to entry definitions that are sent/defined in the same message as the entry datum. In contrast, global scope refers to entry definitions that are sent/defined once, e.g., in a record set dictionary, and re-used across many different messages (i.e., records). For example, record sets of a global scope may be used for encoding equity quotes and/or trades. Further, in one or more configurations, consumer applications might not need to know the difference between the encoding formats. In such configurations, a decoding library may convert differently coded record data into one encoding format or the other, i.e., standard record encoding or record sets encoding.

The data sub-layer may further support fragmentation functionality for dividing large scale record data into manageable fragments and/or messages. Fragments may be created based on logical entry boundaries in the record data to simplify the receiving and decoding process of the receiving application. Receiving applications may thus receive individual fragments and decode those fragments without having to wait for all of the fragments. According to one or more aspects, a total count hint may further be provided to a receiving application. The total count hint indicates a total number of entries within a structure across all fragments. A receiving application may use the total count hint to pre-allocate sufficient memory for caching.

Figure 10:
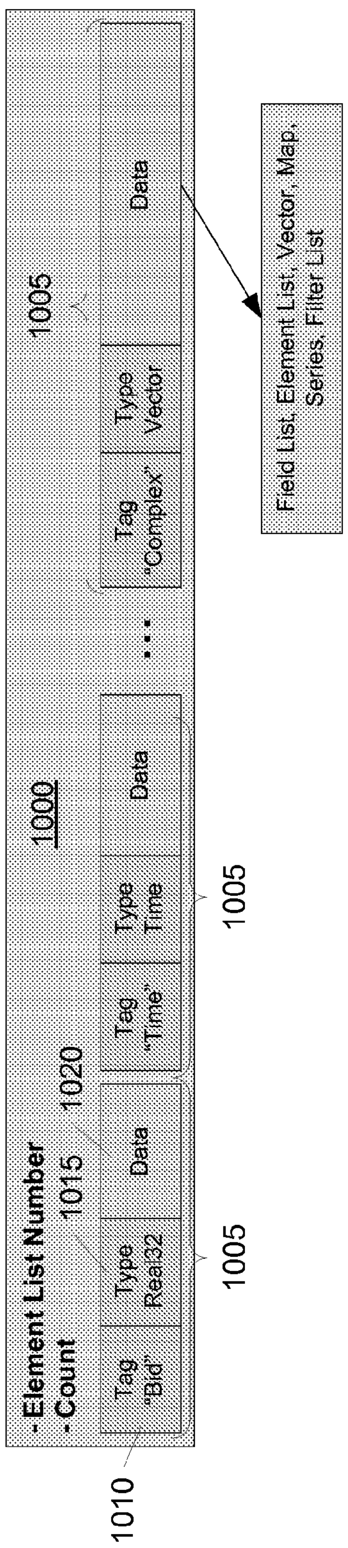
FIG. 10 illustrates an element list data format according to one or more aspects described herein.

Similar to the transport sub-layer and the generic message types/models defined thereby, the data sub-layer may also define one or more generic data formats used to model various types and forms of content. Such generic data formats may include element lists, field lists, vectors, maps, series and filter lists. FIG. 10, for example, illustrates an element list structure 1000 that store multiple field/value pair entries 1005. Field/value pair entries 1005 may be stored sequentially in element list 1000 and may each include attributes such as string based tag 1010, data type 1015 and value/data 1020. String based tag 1010 may be used to specify a field name while data type 1015 may identify the type of data stored in data field 1020. An element list number may further be associated or assigned to element list 1000 to optimize caching logic. For example, assumptions may be made by the caching logic that elements lists with the same element list number contain the same entries/tags/types. In addition, element list numbers may be specific to a certain service provider. A count may also be defined in element list 1000 to track the number of entries and/or records stored in list 1000.

Figure 11:
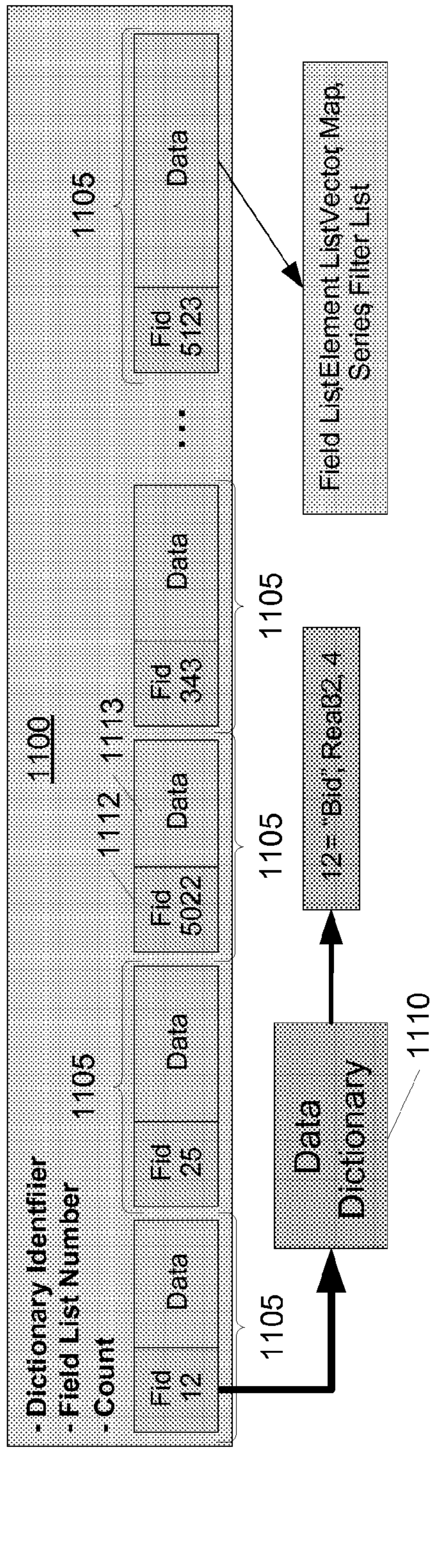
FIG. 11 illustrates a field list data format according to one or more aspects described herein.

FIG. 11 illustrates a field list structure for storing record based content. Field list 1100 stores field identifier/value pairs in field entries 1105. Field identifiers may be a signed 2 byte integer that corresponds to an entry in data dictionary 1110. Using data dictionary 1110, field identifiers such as field identifier 1112 may be converted into a tag name, data type and maximum cache length. Each entry 1105 of field list 1100 may also store data 1113 associated with each field identifier, e.g., field identifier 1112. The information retrieved from data dictionary 1110 may provide meaning and structure to data 1113. Similar to element lists, field list 1100 may include a field list number and a count. Further, field list 1110 may identify one or more dictionaries needed to process and/or interpret entries 1105. Dictionaries may be created or defined by a service provider or, alternatively, by a consumer application. In one or more arrangements, a data dictionary may be specified by a content message model associated with the data or item type stored in the field list.

Figure 12:
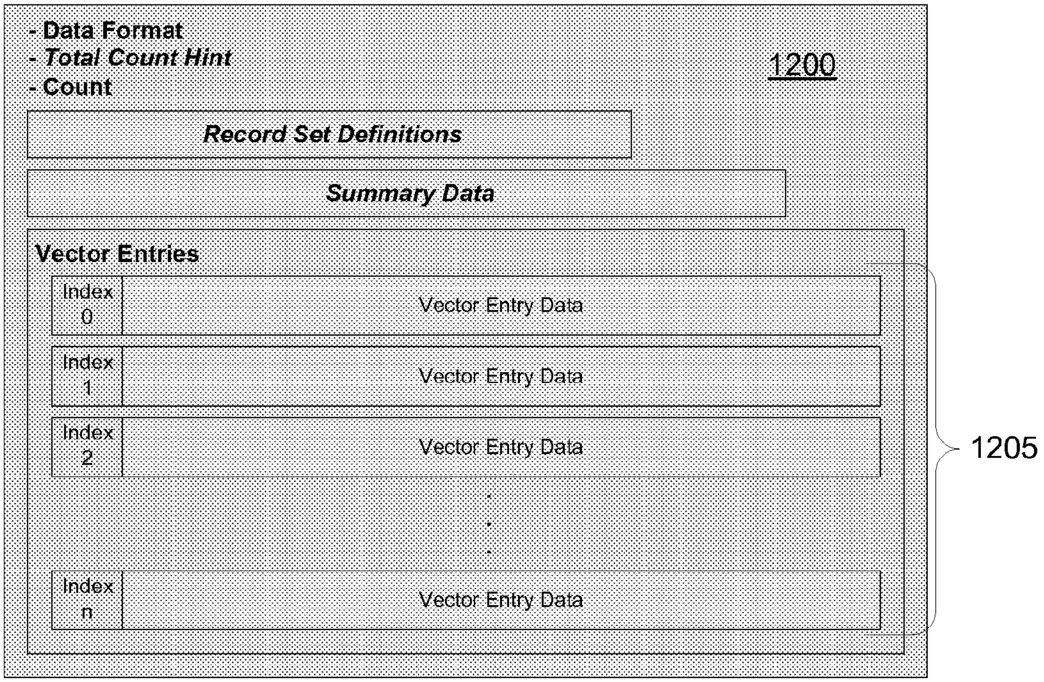
FIG. 12 illustrates a vector data format according to one or more aspects described herein.

FIG. 12 illustrates a vector data structure for storing position oriented entries (i.e., vector entries). Each vector entry position may be identified by an index value, e.g., an index value of 0 may correspond to the first position in the vector. A vector such as vector 1200 may further identify a data format of all entries stored in vector 1200. In other words, all vector entries 1205 may be required to have the same data format. A variety of data formats may be stored as a vector including field lists, element lists, maps, series and filter lists. Vector 1200 may also include summary data for content and/or information that applies to all entries 1205. Alternatively or additionally, a record set definition may be identified by vector 1200 and used to characterize vector entries 1205 if vector entries 1205 are defined by the same record data structure (e.g., same field/value pairs). Entries 1205 in vector 1200 may further be set, updated and/or cleared and may include individual permissions expressions to provide finer control. Entries 1205 in vector 1200 may also support sorting operations such as insert and delete for adding and removing one or more entries from vector 1200. Vectors such as vector 1200 may further be fragmented when being transmitted as a refresh message. As such, vector 1200 may specify a total count hint to facilitate caching at the receiving application.

Figure 13:
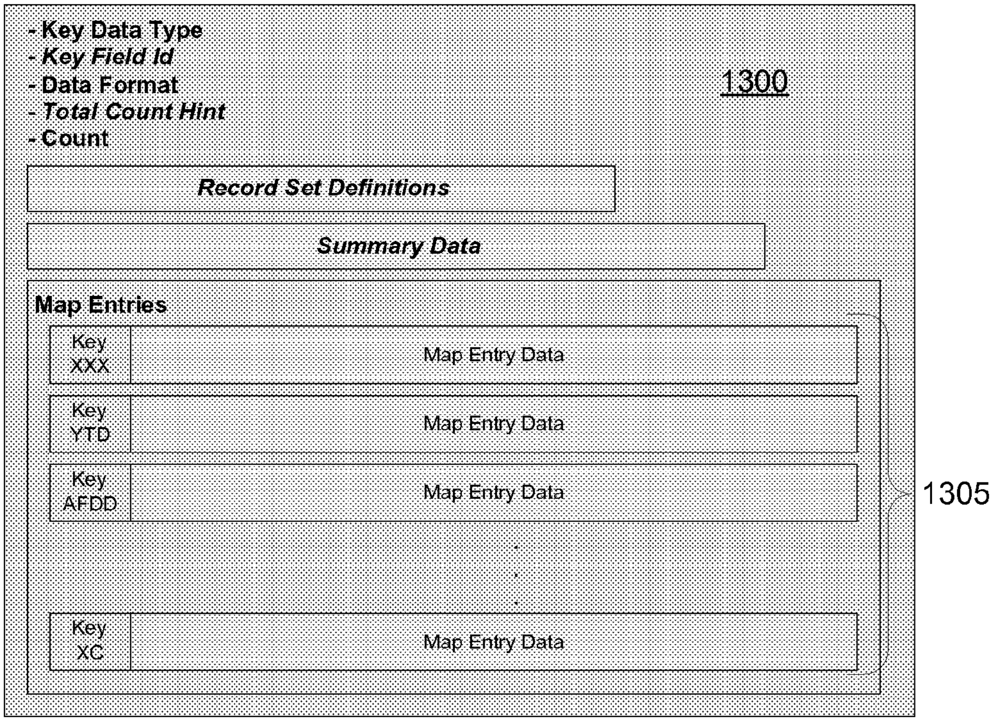
FIG. 13 illustrates a map data format according to one or more aspects described herein.

FIG. 13 illustrates a map data structure that stores entries using keys. Each map entry 1305 in map 1300 may be identified by a key that may take the form of any basic data type. For example, map entries 1305 may be defined by an ASCII string key, binary buffer key or real number key. As with vectors, maps like map 1300 may include add, update and/or remove functionality for managing map entries 1305. Further, each map entry 1305 may include individual permissions expressions. Map entries 1305 may have the same data format as that specified by map 1300.

Figure 14:
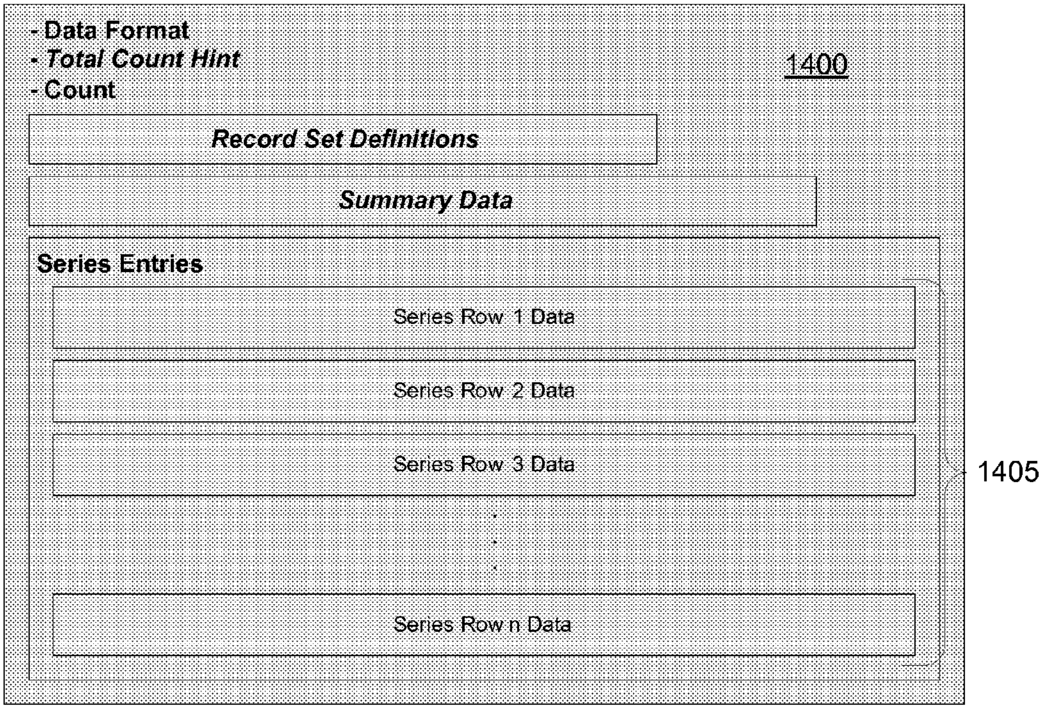
FIG. 14 illustrates a series data format according to one or more aspects described herein.

FIG. 14 illustrates a series data structure that organizes entries 1405 using implicit indices. Series such as series 1400 are similar to maps and vectors, but are typically used to represent and/or store repetitively structured data where entries 1405 may be implicitly indexed by one or more fields (e.g., time, date, etc.). That is, series entries 1405 might not have explicit identification. Series 1400, like vectors and maps, may include a data format specification, a count, record set definitions, summary data and a total count hint. Fragmentation is also supported by series 1400.

Figure 15:
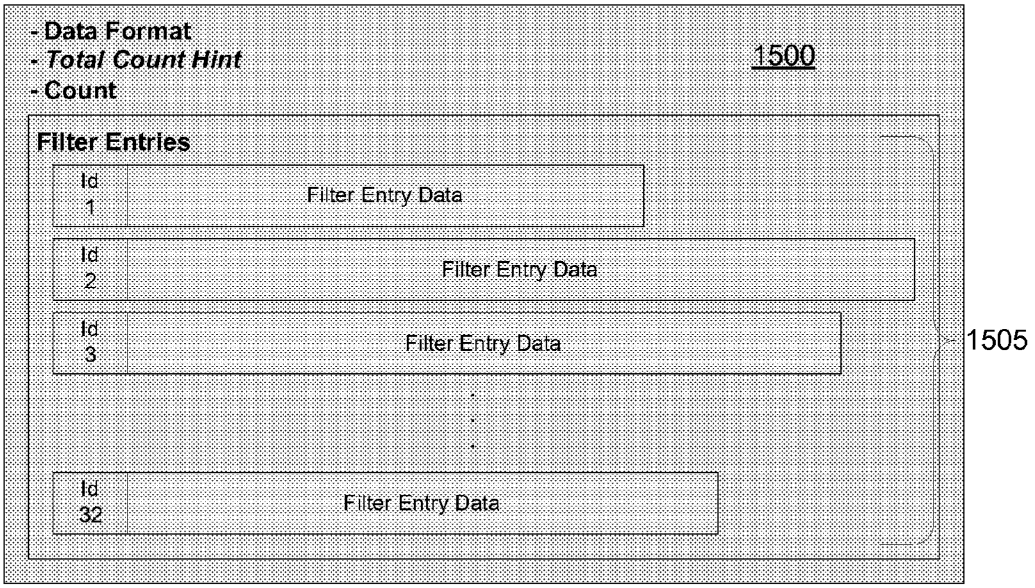
FIG. 15 illustrates a filter entry data format according to one or more aspects described herein.

FIG. 15 illustrates a filter list data structure configured to organize and store filter list entries 1505 based on a bitmap identifier. Filter lists like filter list 1500 are generally defined by a provider and may be used to break up information into selectable entries 1505. The number of possible filter entries 1505 may be defined by the identifier size. That is, if the identifier corresponds to an 8 bit unsigned integer, only 32 entries may be stored to filter list 1500.

The generic data formats discussed herein may be contained or stored within other generic data formats. That is, generic data formats may be nested within one another. For example, a vector data structure may be stored within a filter list data structure and vice versa. In another example, FIG. 10 illustrates a nested field list, element list, vector, map, series and filter list within data 1020 of field/value pair entries 1005 in element list 1000. Thus, according to additional and alternative aspects described herein, nested data formats may be retrieved and decoded by traversing the depth and breadth of the generic data format.

Referring again to FIG. 4, domain message model 401 may be used to define real world objects (e.g., market price and news headlines) in accordance with the requirements and characteristics of those objects. For example, a market price object may include stock symbols and stock prices while a news headline object may include subject, author and newspaper source information. Thus, objects may be defined using domain message model 401 to specifically suit the needs of a particular industry, organization or application. In particular, domain message model 401 may use the generic message types and data models supplied by open message model 402 to build the aforementioned objects. For example, domain message model 401 may include item type model 420 which defines the object types, corresponding transport behavior and/or data representation (i.e., data formats). These concepts and components of an object may be defined using the abstractions, models and concepts developed and supported by open message model 402. Item type model 420 may further be used to define a structure or content of an object type, transport behavior of the object type and data representation (e.g., data formats). Domain message model 401 may further include content definition model 421 that builds upon item type model 420 to define field meanings and relationships used by item type model 420. Content definition model 421 may include data dictionaries, enumeration information and required/optional field definitions. Enumeration information may be used to translate an enumerated field into corresponding data or type of data. Additionally, item type model 420 may, in one or more instances, be associated with many content definition models like content definition model 421.

Figure 16A:
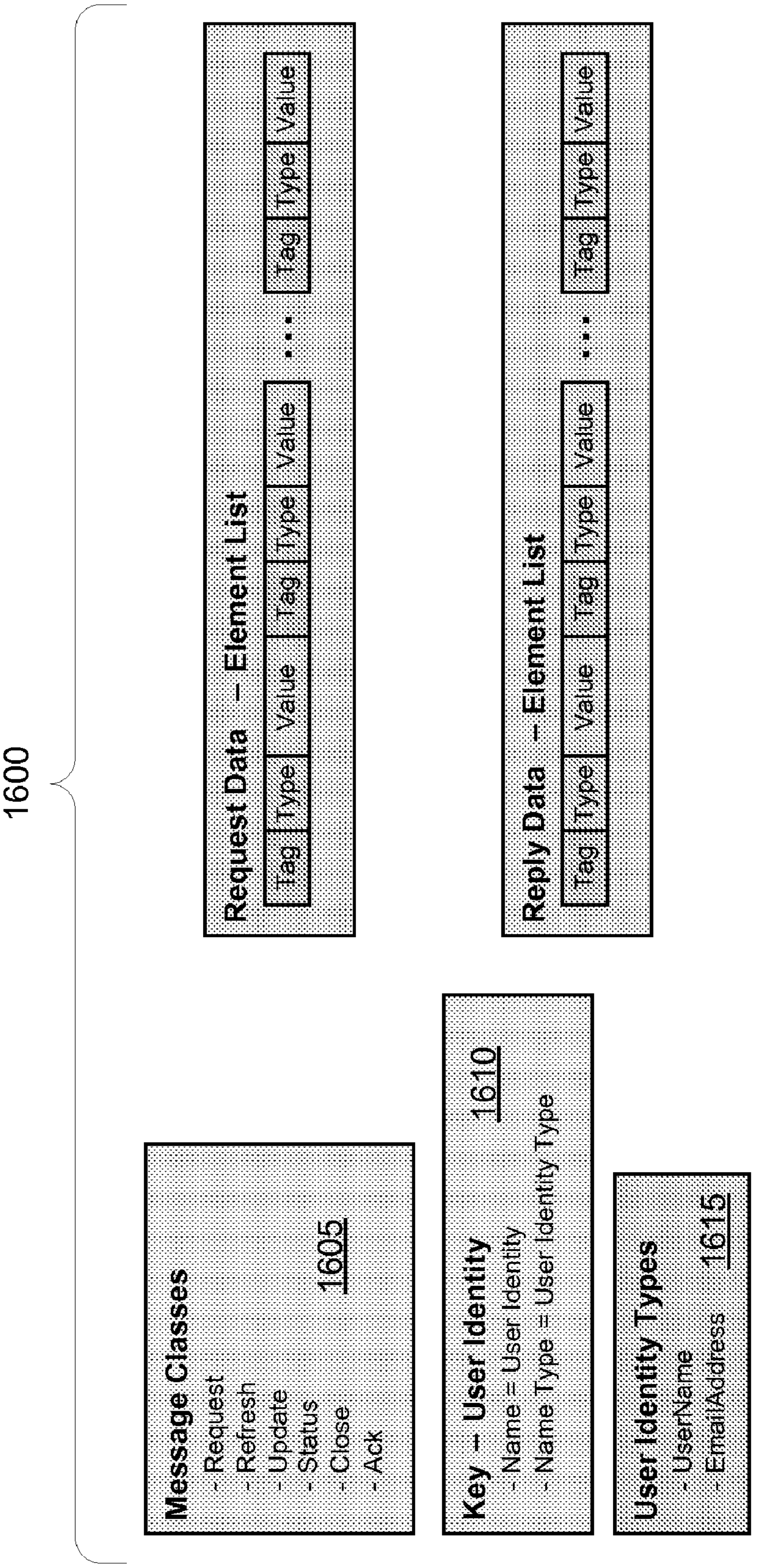

FIGS. 16A-D illustrate various aspects a login item type model created using the concepts, abstractions and models of the open message model. FIG. 16A illustrates the components and elements of login item type model 1600 that may be used to authorize access to a service provider. Login item type model 1600 may further construct a context within an access point (e.g., access point 307 of FIG. 3) for all other types of interactions. That is, login item type model 1600 may define certain information types and meanings that are to be applied to messages and data associated with login item types. For example, login item type model 1600 may define message classes 1605 that are available for interactions associated with the login item type. Login item type model 1600 may further specify data formats or types associated with the name field stored within a message's key element 1610. The name field of message key 1610 may also be defined according to name types 1615, e.g., usernames and email addresses, specified by the domain model (i.e., login item type model 1600).

FIG. 16B is a table identifying the transport semantics associated with login item type model 1600 of FIG. 16A. The transport semantics define and/or specify the various interactions permitted or supported by the domain message model. For example, login item type model 1600 may indicate that interactions associated with the login item type are to follow the request/response with interest interaction paradigm. Login item type model 1600 may further define the meaning or context of one or more generic message types (e.g., request, refresh, status, etc.) defined by the underlying open message model. According to one or more arrangements, the generic messages are provided meaning based on a domain message model while maintaining and using the message and transport semantics and data formats defined by the transport and data layers. As an example, a request message associated with a login item type may be defined by model 1600 as a login request into an access point. Further, the payload of the request message is characterized by model 1600 as login options/parameters. Accordingly, a recipient consumer, device and/or user may apply such definitions and meanings to decode and/or translate the various message types and the data stored therein.

FIG. 16C illustrates the data format used by request and reply data associated with a login item type. In one or more configurations, login item type requests and replies may be formatted using element lists (e.g., element list 1000 of FIG. 10). Thus, each request and response (e.g., refresh or update messages) follows the "Tag, Type, Value" data format. For example, in request data 1620, the element list stores, among others, an Application ID of ASCII string type as well as a Password of buffer data type. Reply data 1630 stores data such as AccessPoint of ASCII string data type and a Permission Profile of buffer data type. Permission profile information may refer to status, authorizations and permissions associated with a particular user. Request and refresh data may be used in a variety of manners. A "NoRefresh" request data, for instance, may be used to modify parameters of an access point. Unsolicited refresh messages, on the other hand, may be used to reset all reply data (e.g., new user profile). Alternatively or additionally, update messages may be used to update parts of the data sent in refresh messages (e.g., modifying parts of a user profile).

Figure 16D:
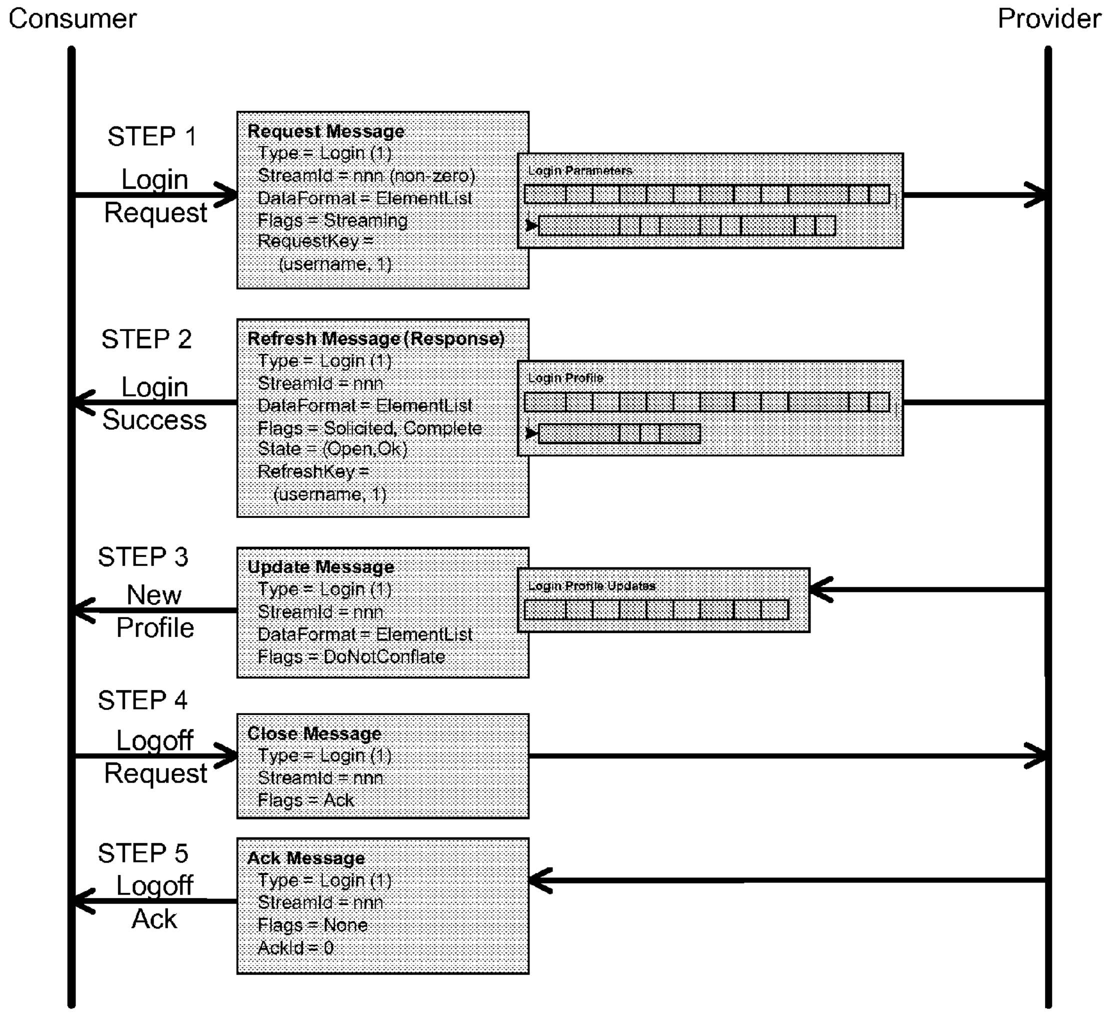

FIG. 16D illustrates an example interaction involving login item types. In step 1, a consumer may initially transmit a login request (i.e., request message) to the provider or an access point thereof. The request message may include a user identity key, flags to indicate a streaming interaction and an element list that contains various parameters. In step 2, the provider may then respond to the request message with a login success message. The login success message may be formatted as a refresh message that specifies an open stream data and an ok data state and includes an element list containing requested information (e.g., permissions profile) or parameters. After logging in, a consumer may proceed to interact with the access point/provider in a desired manner and may use other item type models in such interactions. At times, such as in step 3, the provider may transmit update messages to the consumer to update any of the requested or default data sent in the response of step 2. For example, changes to permissions profile may be updated using an update message. After the consumer has completed interactions with the provider or access point, the consumer may issue a logoff request as illustrated by step 4. The logoff request may take the form of a close message that identifies the stream the consumer wishes to close. The close message may further indicate the ack option which elicits an ack response from the provider in step 5 confirming successful logoff.

FIGS. 17A-D illustrate a market price item type model which may be used store and/or transmit information relating to trades, indicative quotes and top of book quotes. Market price item types may be defined for or applied to a variety of market instruments including equities, fixed income, commodities, money, FX (i.e., foreign exchange rates) and contributed quote data. The market data and prices associated with these instruments may be conveyed using message classes 1705*a*, instrument key 1705*b*, key types 1705*c* and data format 1705*d*. In particular, instrument key 1705*b* may store a name or symbol of the corresponding instrument. For example, a stock instrument key may identify a stock by its symbol in order to retrieve data about that stock. Instrument key types 1705*c* may define the various types of identification (i.e., names) that are understood or accepted by market price model 1700. Further, model 1700 may define a particular data format 1705*d* in which market information and/or data is to be stored. In one example, market price data may be represented in a field list format. As such, one or more data dictionaries may be specified by the field list and/or a corresponding content definition model for facilitating the translation and interpretation of the field id designations.

In one or more configurations, market price information may be communicated and/or accessed using request/response paradigms (with or without interest). In other words, market price data may be communicated through a single request/response message pair or through an event stream where updates and/or refresh messages are communicated periodically and/or intermittently. FIG. 17B is a table describing various transport semantics of market price model 1700. For example, the transport semantics may assign multiple responsibilities for refresh messages including resetting market price/event stream data, responding with market price information for the requested instrument and/or redefining an identifier associated with a particular instrument (e.g., changing the name type in the instrument key). Transport semantics may also support multiple options such as priority support, quality of service, even stream groupings and sequence numbering. One of skill in the art will appreciate that numerous other types of transport semantics may also be defined by market price type model 1700 using various aspects of the extensible system and architecture described herein.

Figure 17C:
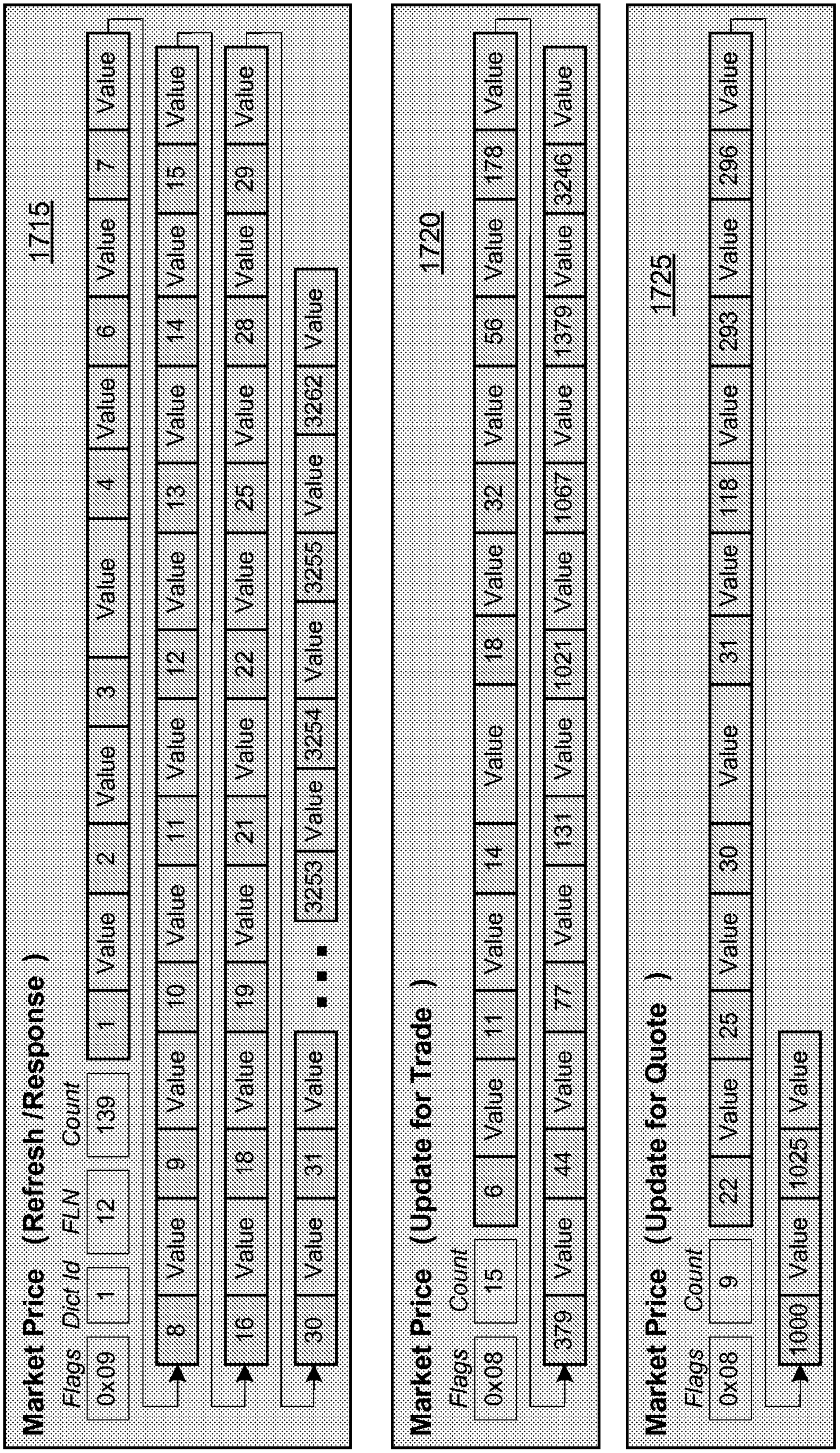

FIG. 17C illustrates data encodings for three types of market price messages. A response such as refresh message 1715 generally includes and encodes all of the field/value pairs that make up the instruments corresponding to the messages. For example, a stock instrument may include fields such as open price, close price, day high, day low, 52-week high and 52-week low. In contrast, update messages such as quote update 1725 and trade update 1720 might only include the field/value pairs that are to be updated. Field lists may further use either standard record encoding or record set encoding or both.

Figure 17D:
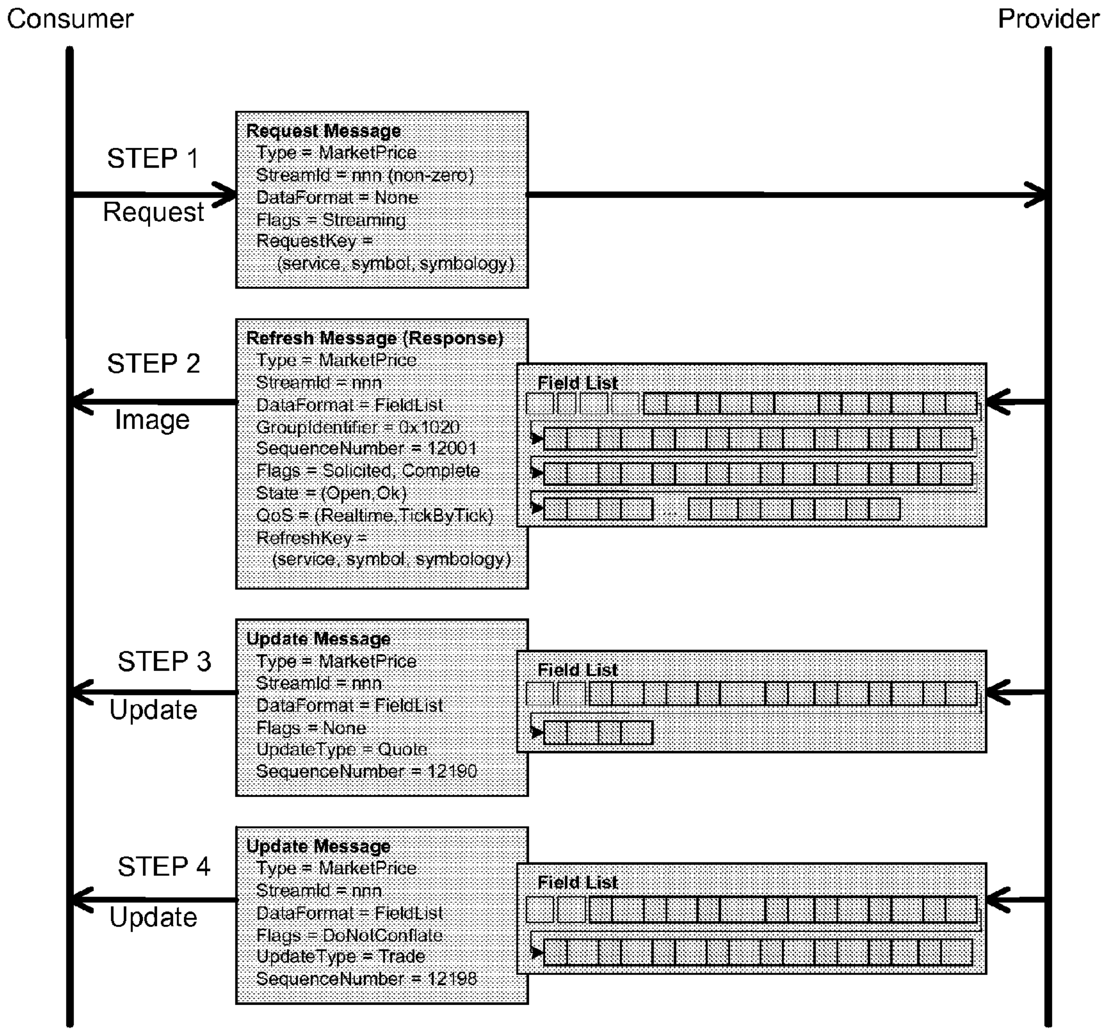

FIG. 17D illustrates an example interaction involving market price data and instruments between a consumer and provider. The interaction may include multiple steps such as requests, refreshes and updates. In step 1, for example, a request message may be sent by the consumer to the provider. The request message may specify the item type as "MarketPrice" and identify the requested instrument or information using service, symbol and/or symbology fields in the RequestKey. In response to the request, the provider may receive market price data in a refresh message in step 2. The market price data may be formatted as a field list and stored in the payload section of the refresh message. Since market prices may change during the day, the consumer may receive update messages in steps 3 and 4 that modify the data for one or more fields. In one or more instances, the consumer may only receive updates to certain portions of the field list. As such, only the changed field/value pairs might be sent.

Figure 18:
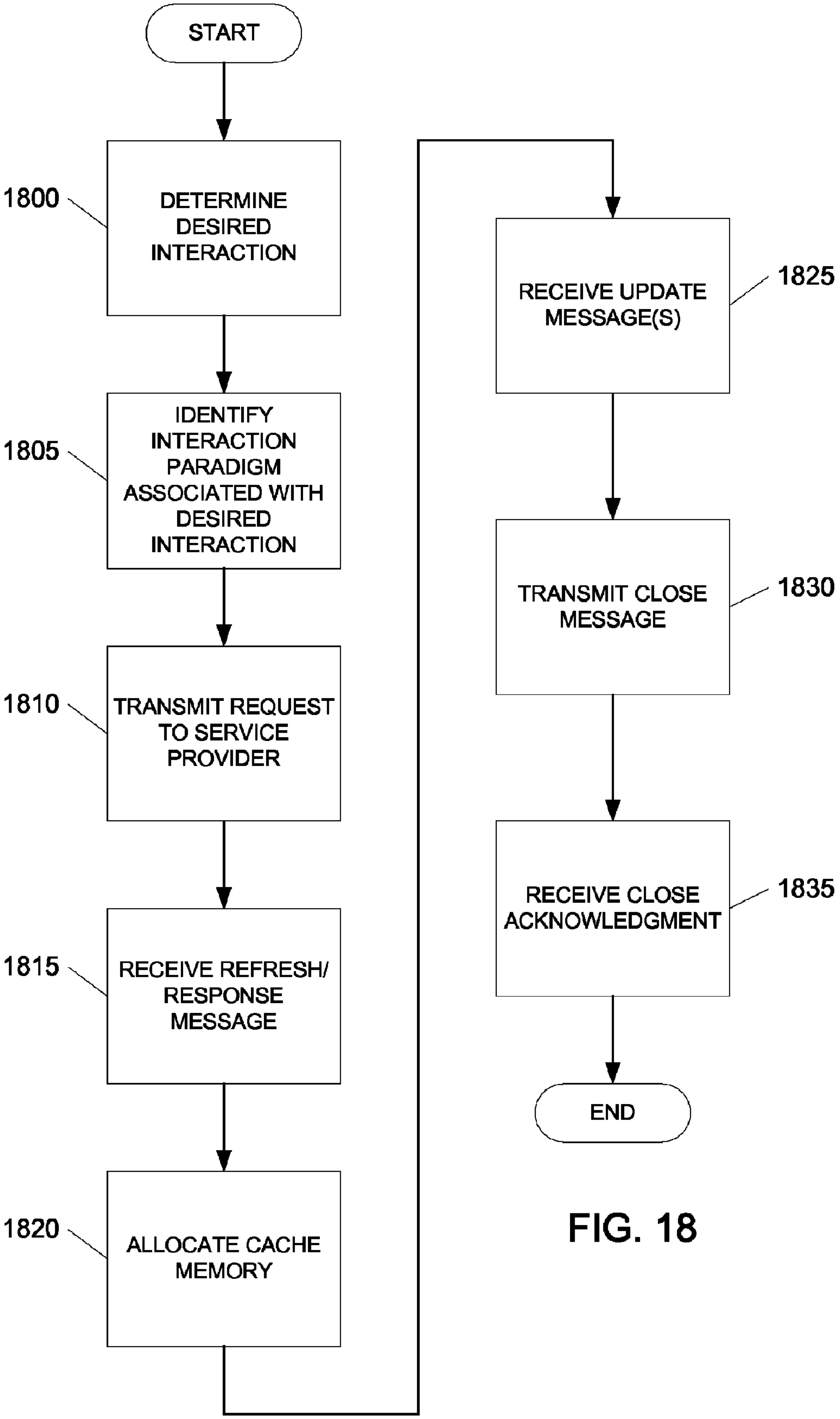
FIG. 18 is a flowchart illustrating a method for interacting with a service provider according to one or more aspects described herein.

FIG. 18 is a flowchart illustrating a method for interacting with a service provider based on a message model. In step 1800, a consumer application may determine a desired interaction with the service provider. For example, a consumer application may wish to request a quote, make a bid and/or monitor stock prices. In step 1805, the consumer application may further identify an interaction paradigm associated with the desired interaction. An interaction such as monitoring stock prices may, for example, correspond to a request/response with interest paradigm so that stock prices may be updated periodically and/or intermittently using streaming events. In step 1810, the consumer application may transmit a request message to the service provider. The request message may be formatted according to a generic request message defined by the message model. For example, the request message may include fields such as quality of service, data format, priority information and stream identification. In one or more arrangements, the request message may specify the interaction paradigm to which the interaction will correspond. The request message may further be transmitted through a data system rather than directly. The request may also identify and/or specify a stream identifier that identifies an event stream to which the request message is associated (e.g., if the event stream was previously initiated or created).

In response to the request message, the consumer application may receive a refresh message in step 1815. The refresh message may include payload data that is formatted according to data formats defined by the message model. For example, market price information may be represented in the payload data by one or more field lists. The field list or payload data may further specify one or more data dictionaries for interpreting the information stored in the field list and/or payload data. According to one or more aspects, data requested by the consumer application may be fragmented into smaller parts if the bandwidth required for sending the data all at once is too large. In such an event, the refresh message may indicate a total count hint. Thus, in step 1820, the consumer application may allocate sufficient memory for caching the fragmented data. This prevents potential buffer or memory overruns.

In step 1825, the consumer application may receive one or more update messages that provides additional information associated with the requested data or interaction. For example, requesting a stock price monitoring service may involve receiving multiple update messages periodically and/or aperiodically throughout the day when the monitored stock price changes. In another example, a consumer requesting a stock transaction may initially receive a bid confirmation in the refresh message. A completion message may be received at a later time once the transaction has been completed. Once the requested service has been performed or the requested data has been received, consumer application may send a close message to the service provider to close the event stream associated with the interaction in step 1830. If the consumer application requests acknowledgment in the close message, the consumer application may then receive an acknowledgment message from the service provider in step 1835.

Various aspects of the methods, models and architectures described herein may be stored in a computer readable medium in the form of computer readable instructions. Types of computer readable media may include magnetic tape drives, optical storage, flash drives, random access memories (RAM), read only memories (ROM) and the like. In addition, aspects of the methods, models and architectures described herein may also be used with other industries and applications. For example, the generic messages defined by the open message model may be used to describe and represent book information for a library application.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method for interacting with a service provider, the method comprising:

receiving, by an application executing on a computing system having at least one processor, a selection of a desired messaging interaction for obtaining news information, wherein the desired messaging interaction includes a requested type of data and an action to be taken with the requested type of data;

determining, by the application, a predefined interaction paradigm from a plurality of predefined interaction paradigms based on the desired messaging interaction, wherein the predefined interaction paradigm defines types of messages to be exchanged between the application and the service provider and an order thereof for the desired messaging interaction and wherein the plurality of predefined interaction paradigms are defined by a transport layer of an open message model;

generating, by the application, a request message according to a generic request message type defined by the transport layer of the open message model, wherein an underlying structure of the generic request message type is the same irrespective of a type of data carried in the request message and a use context for the data transported in the request message;

transmitting, by the application, the request message to the service provider requesting data associated with the desired messaging interaction, wherein the request message indicates the predefined interaction paradigm;

receiving, by the application, a refresh message from the service provider, wherein the refresh message includes payload data formatted according to a generic data format defined by a data layer of the open message model, wherein the generic data format includes at least two of an element list, a field list, a vector, a map, a series and a filter list;

processing, by the application, the payload data according to the use context, wherein the use context is defined by a domain message model and is modifiable by changing the domain message model without changing the transport layer and the data layer of the open message model, and wherein the use context defines a meaning of the payload data such that changing the use context for the payload data changes the meaning of the payload data; and allocating cache memory according to a total count hint specified in the refresh message, wherein the total count hint identifies at least one of an approximate or an exact amount of data being transmitted from the service provider in response to the request message.

2. The method according to claim 1, wherein in response to identifying the interaction paradigm as a request/response with interest interaction:

defining an event stream; and receiving one or more update messages in the event stream.

3. The method according to claim 2, further comprising the steps of:

identifying a data dictionary corresponding to the use context of the refresh message; and interpreting at least a portion of the payload data based on the data dictionary.

4. The method according to claim 1, further comprising the step of:

processing the payload data according to a second use context upon the domain message model being changed to a second domain message model, wherein the second use context is defined by the second domain message model.

5. The method of claim 4, further comprising:

changing the domain message model to the second domain message model corresponding to the second use context without changing the underlying structure of generic message types defined by the predefined interaction paradigm.

6. The method of claim 4, further comprising defining a quality of service window for receiving the requested data using a plurality of quality of service fields in the request message.

7. The method of claim 4, wherein the plurality of interaction paradigms includes a first interaction paradigm comprising a first set of generic message types and a second interaction paradigm comprising a second set of generic message types different from the first set.

8. The method of claim 1, further comprising:

determining, using the domain message model, a meaning of each of multiple generic request message types defined by the predefined interaction paradigm.

9. The method of claim 1, wherein processing the payload data includes:

determining an item type model of the domain message model, wherein the item type model defines real world objects associated with the payload data; and determining a content definition model of the domain message model, wherein the content definition model defines field meanings and field relationships of the payload data.

10. The method of claim 1, wherein the payload data includes requested news information and the use context defines a type of news information.

11. The method of claim 10, wherein the news information includes stock quotes.

12. An apparatus comprising:

at least one processor; and memory operatively coupled to the at least one processor and storing computer readable instructions, wherein the computer readable instructions, when executed, cause an application executing on the apparatus to:

receive a selection of a desired messaging interaction, wherein the desired messaging interaction includes a requested type of data and an action to be taken with the requested type of data;

determine a predefined interaction paradigm from a plurality of predefined interaction paradigms based on the desired messaging interaction, wherein the predefined interaction paradigm defines types of messages to be exchanged between the application and the service provider and an order thereof for the desired messaging interaction and wherein the plurality of predefined interaction paradigms are defined by a transport layer of an open message model;

generate a request message according to a generic request message type defined by the transport layer of the open message model, wherein an underlying structure of the generic request message type is the same irrespective of a type of data carried in the request message and a use context for the data transported in the request message;

transmit the request message to the service provider requesting data associated with the desired messaging interaction, wherein the request message indicates the predefined interaction paradigm;

receive a refresh message from the service provider, wherein the refresh message includes payload data formatted according to a generic data format defined by a data layer of the open message model, wherein the generic data format includes at least two of an element list, a field list, a vector, a map, a series and a filter list;

process the payload data according to the use context, wherein the use context is defined by a domain message model and is modifiable by changing the domain message model without changing the transport layer and data layer of the open message model, and wherein the use context defines a meaning of the payload data such that changing the use context for the payload data changes the meaning of the payload data; and allocate cache memory according to a total count hint specified in the refresh message, wherein the total count hint identifies at least one of an approximate or an exact amount of data being transmitted from the provider in response to the request message.

13. The apparatus of claim 12, wherein the plurality of interaction paradigms includes a first interaction paradigm comprising a first set of generic message types and a second interaction paradigm comprising a second set of generic message types different from the first set.

* * * * *